US008687488B2

(12) United States Patent
Itaya et al.

(10) Patent No.: US 8,687,488 B2
(45) Date of Patent: Apr. 1, 2014

(54) INFORMATION PROCESSING DEVICE AND METHOD

(75) Inventors: Natsuki Itaya, Tokyo (JP); Satoshi Futenma, Tokyo (JP)

(73) Assignee: Sony Corporation, Tokyo (JP)

( * ) Notice: Subject to any disclaimer, the term of this patent is extended or adjusted under 35 U.S.C. 154(b) by 1073 days.

(21) Appl. No.: 12/692,086

(22) Filed: Jan. 22, 2010

(65) Prior Publication Data

US 2010/0246395 A1 Sep. 30, 2010

(30) Foreign Application Priority Data

Mar. 30, 2009 (JP) ................................. 2009-083255

(51) Int. Cl.
*G01R 31/08* (2006.01)
(52) U.S. Cl.
USPC ........................................................ 370/232
(58) Field of Classification Search
USPC ................... 370/329, 231, 352, 232
See application file for complete search history.

(56) References Cited

U.S. PATENT DOCUMENTS

| 6,005,852 | A  | * | 12/1999 | Kokko et al. | 370/329 |
|---|---|---|---|---|---|
| 7,016,339 | B1 | * | 3/2006 | Naudus et al. | 370/352 |
| 7,385,921 | B2 |   | 6/2008 | Itakura et al. | |
| 2007/0269122 | A1 |   | 11/2007 | Fukuhara et al. | |
| 2007/0279683 | A1 |   | 12/2007 | Iwami et al. | |
| 2008/0063078 | A1 |   | 3/2008 | Futenma et al. | |
| 2008/0107040 | A1 |   | 5/2008 | Mizoguchi et al. | |
| 2009/0102686 | A1 |   | 4/2009 | Fukuhara et al. | |
| 2013/0077488 | A1 | * | 3/2013 | Babiarz et al. | 370/231 |

FOREIGN PATENT DOCUMENTS

| JP | 5-260090 | 10/1993 |
|---|---|---|
| JP | 6-30396 | 2/1994 |
| JP | 7-184196 | 7/1995 |
| JP | 2005-244315 | 9/2005 |
| JP | 2007-311924 | 11/2007 |
| WO | WO 2008/041300 A1 | 4/2008 |
| WO | WO 2008/093698 A1 | 8/2008 |

OTHER PUBLICATIONS

Japanese Office Action issued Sep. 25, 2012, in Japan Patent Application No. 2009-083255.
Christos Chrysafis et al., "Line-Based, Reduced Memory, Wavelet Image Compression", IEEE Transactions on Image Processing, vol. 9, No. 3, Mar. 2000, pp. 378-389.
Wim Sweldens, "The Lifting Scheme: A Custom-Design Construction of Biorthogonal Wavelets", Applied and Computational Harmonic Analysis, vol. 3, No. 2, 1996, pp. 186-200.

* cited by examiner

*Primary Examiner* — Thai Hoang
*Assistant Examiner* — Gbemileke Onamuti
(74) *Attorney, Agent, or Firm* — Oblon, Spivak, McClelland, Maier & Neustadt, L.L.P.

(57) ABSTRACT

An information processing device includes: an encoding section that encodes image data to generate a codestream, the image data being to be transmitted to another information processing device; a controlling section that controls whether or not main data of the codestream is to be transmitted, on the basis of whether or not an amount of data of the codestream exceeds an allowable rate that is an upper limit value of a bitrate at which the codestream is flawlessly transmittable; a packetizing section that packetizes the codestream into packets when the amount of data of the codestream does not exceed the allowable rate and that packetizes only a header of the codestream when the amount of data of the codestream exceeds the allowable rate, in accordance with the control performed by the controlling section; and a transmitting section that transmits the packets to the another information processing device.

18 Claims, 19 Drawing Sheets

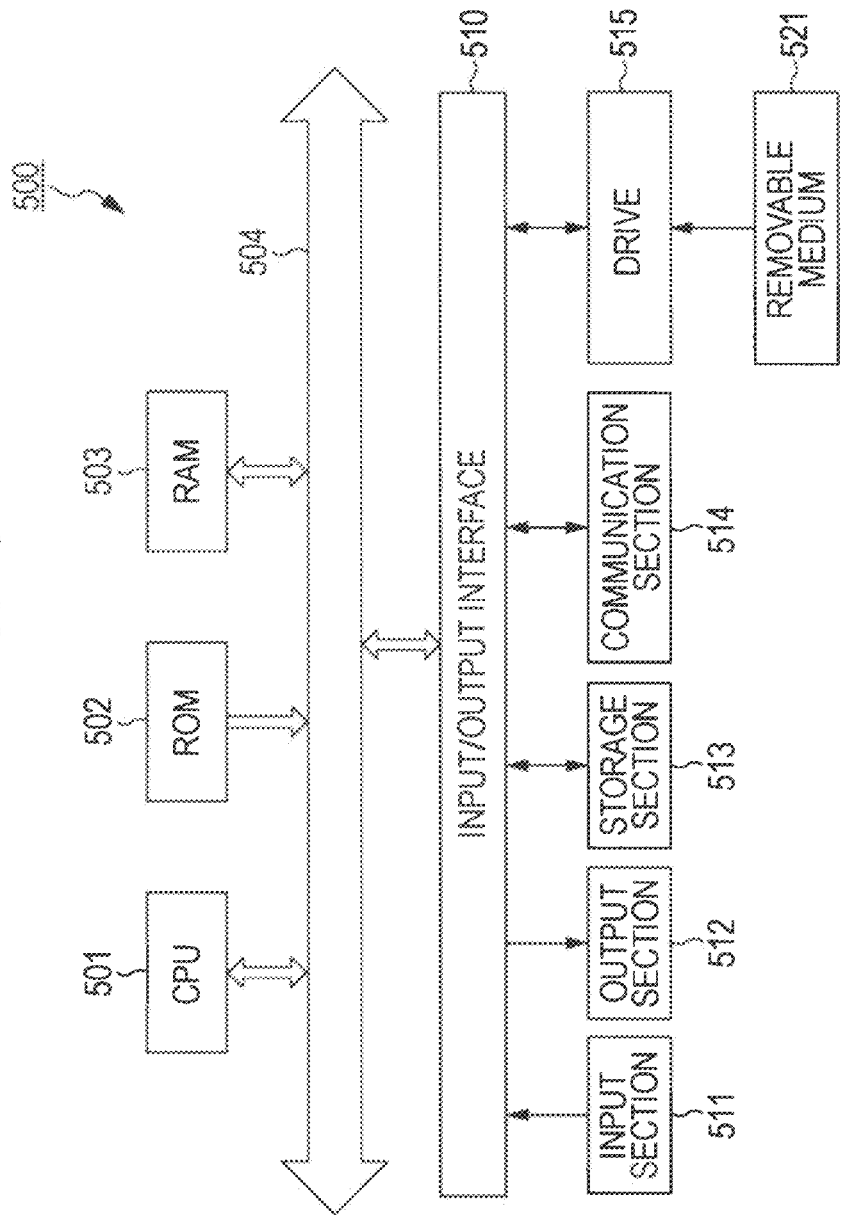

INFORMATION PROCESSING DEVICE AND METHOD

BACKGROUND OF THE INVENTION

1. Field of the Invention

The present invention relates to information processing devices and methods. In particular, the present invention relates to an information processing device and method that are capable of suppressing image-quality deterioration that occurs during transmission of image data.

2. Description of the Related Art

Various schemes have been proposed to encode image data. Examples include MPEG-2 (Moving Picture Experts Group 2) and AVC (Advanced Video Coding) technologies, which perform compression processing on multiple frames in a moving picture at a time by using inter-frame correlations and motion compensation, and Motion JPEG (Joint Photographic Experts Group) and JPEG 2000 technologies, which perform processing for each frame without using inter-frame correlations.

In general, the former technologies have characteristics of a high compression rate and a large amount of delay and the latter have characteristics of a small amount of delay and a relatively low compression rate. For main image-coding schemes of such technologies, a VBR (variable bitrate) is often used.

For example, Japanese Unexamined Patent Application Publication No. 2007-311924 discloses a scheme in which compression encoding based on wavelet transform is performed using multiple lines in each picture of a moving image as one compression encoding block. In the disclosed scheme, an encoding device can start compression encoding before all data in the picture are input. When compressed data is transmitted through a network and a receiving end decodes the compressed data, a decoding device can start decoding processing before receiving all data in the picture. Thus, when the amount of transmission delay in the network is sufficiently small, real-time moving-image transmission can be achieved with an amount of delay which is not greater than the frame intervals.

In general, image data are encoded and compressed using the above-described technologies and are transmitted as compressed data, in order to reduce the amount of load in a transmission channel. The bandwidth of the transmission channel is finite and thus the transmittable rate thereof has an upper limit. Thus, typically, a target bitrate of encoding is set smaller or equal to the upper-limit value of the transmission rate of the transmission channel.

SUMMARY OF THE INVENTION

However, for example, when an image becomes complex suddenly due to change of a scene or the like, the encoding difficulty also increases suddenly. In such a case, the amount of data of a codestream generated as a result of encoding of image data may increase temporarily to exceed the target bitrate. For example, in the method disclosed in Japanese Unexamined Patent Application Publication No. 2007-311924, rate control is also performed on an entire picture in accordance with the target bitrate. However, even in the same picture, depending on the position therein, the image complexity and so on may differ. Thus, since the bitrate is varied for a unit of encoding processing which is smaller than a unit of a picture, the bitrate may temporarily exceed the target bitrate.

In such a case, when a codestream having a bitrate exceeding the target bitrate is directly transmitted, a band used for packet retransmission and error correction for dealing with packet loss or the like that occurs in the transmission channel is consumed. This may affect the functions of the packet transmission and error correction, resulting in a decrease in the playback image quality of a moving image.

In addition, for example, when the receiving end is to play back an image while image data therefor is being transmitted, frame-playback preparation (including completing transmission of a frame to be played back, performing predetermined processing, and putting the frame into a state in which it can be played back) generally has to be performed by a predetermined playback timing. Thus, when the bitrate of the codestream exceeds the upper limit value of the transmission rate of the transmission channel, the amount of transmission delay increases and the data is not transmitted in time for the image playback. Furthermore, since the influence also affects subsequent frames, the playback image quality of the moving image can also decrease.

In view of such a situation, it is desirable to make it possible to suppress image-quality deterioration that occurs during transmission of image data.

According to one embodiment of the present invention, there is provided an information processing device. The information processing device includes: encoding means for encoding image data to generate a codestream, the image data being to be transmitted to another information processing device; controlling means for controlling whether or not main data of the codestream is to be transmitted, on the basis of whether or not an amount of data of the codestream generated by the encoding means exceeds an allowable rate that is an upper limit value of a bitrate at which the codestream is flawlessly transmittable; packetizing means for packetizing the codestream into packets when the amount of data of the codestream does not exceed the allowable rate and for packetizing only a header of the codestream when the amount of data of the codestream exceeds the allowable rate, in accordance with the control performed by the controlling means; and transmitting means for transmitting the packets, packetized by the packetizing means, to the another information processing device.

Before the codestream is held in a buffer, the controlling means may control whether or not the main data of the codestream is to be transmitted; and the packetizing means may read the codestream held in the buffer and packetize the read codestream.

The controlling means may include: monitoring means for monitoring an amount of buffer, the amount indicating the amount of data of the codestream held in the buffer; allowable-rate setting means for setting the allowable rate on the basis of the current amount of buffer monitored by the monitoring means and an upper limit value of a transmittable bitrate of a transmission channel through which the image data is transmitted to the another information device; determining means for determining whether or not the amount of data of the codestream exceeds the allowable rate set by the allowable-rate setting means; and supplying means for supplying the codestream to the buffer and causes the codestream to be held therein.

The controlling means may further include adding means for adding flag information to the header of the codestream when the determining means determines that the amount of data of the codestream exceeds the allowable rate. When the flag information is added to the header of the codestream, the packetizing means may discard the main data of the codestream and packetize only the header.

The controlling means may further include target-rate setting means for determining a target rate on the basis of the upper limit value of the transmittable bitrate of the transmission channel, the target rate having a target value of an amount of code in the encoding performed by the encoding means. The allowable-rate rate setting means may set the allowable rate on the basis of the current amount of buffer monitored by the monitoring means and the target rate determined by the target-rate setting means.

The information processing device may further include obtaining means for obtaining feedback information indicating a receiving-end data-loss state of the codestream, the feedback information being transmitted from the another information processing device. The target-rate setting means may determine the target rate on the basis of the feedback information obtained by the obtaining means.

The encoding means may include: wavelet transforming means for performing wavelet transform processing on the image data, the wavelet transform processing being processing in which analysis filter processing for decomposing, for each band, frequency components of the image data into low-frequency components and high-frequency components is recursively performed on low-frequency components a predetermined number of times; quantizing means for quantizing the frequency components decomposed for each band; and entropy encoding means for performing entropy encoding on the frequency components quantized by the quantizing means.

The wavelet transforming means may perform the wavelet transform processing for each precinct including continuous lines in a picture of the image data.

According to another embodiment of the present invention, there is provided an information processing method. The information processing method includes the steps of: causing encoding means of an information processing device to encode image data to generate a codestream, the image data being to be transmitted to another information processing device; causing controlling means of the information processing device to control whether or not main data of the codestream is to be transmitted, on the basis of whether or not an amount of data of the generated codestream exceeds an allowable rate that is an upper limit value of a bitrate at which the codestream is flawlessly transmittable; causing packetizing means of the information processing device to packetize the codestream into packets when the amount of data of the codestream does not exceed the allowable rate and to packetize only a header of the codestream when the amount of data of the codestream exceeds the allowable rate, in accordance with the control performed by the controlling means; and causing transmitting means of the information processing device to transmit the packets to the another information processing device.

According to still another embodiment of the present invention, there is provided an information processing device. The information processing device includes: receiving means for receiving a codestream transmitted from another information processing device; analyzing means for analyzing a header of the codestream received by the receiving means; loss determining means for determining whether or not data in the codestream is lost, on the basis of a result of the analysis performed by the analyzing means; recovering means for recovering, when the loss determining means determines that the data is lost, the lost data on the basis of information contained in the header; and decoding means for decoding the codestream whose lost data was recovered by the recovering means or the codestream determined by the loss determining means as a codestream without data loss.

The recovering means may recover the lost data by using data selected on the basis of weighting of a quantization parameter contained in the header.

The information processing device may further include transmitting means for transmitting, to the another information processing device, feedback information for notifying the another information processing device about a state of the data loss.

The information processing device may further include: flag-information determining means for determining whether or not flag information added by the another information processing device is present in the header, in accordance with a result of the analysis performed by the analyzing means; and generating means for generating the feedback information, when the loss determining means determines that the data is lost and the flag-information determining means determines that the flag information is absent.

According to yet another embodiment of the present invention, there is provided an information processing method. The information processing method includes the steps of: causing receiving means of an information processing device to receive a codestream transmitted from another information processing device; causing analyzing means of the information processing device to analyze a header of the received codestream; causing loss determining means of the information processing device to determine whether or not data in the codestream is lost, on the basis of a result of the analysis; causing recovering means of the information processing device to recover, when it is determined that the data is lost, the lost data on the basis of information contained in the header; and causing decoding means of the information processing device to decode the codestream whose lost data was recovered or the codestream determined as a codestream without data loss.

According to one embodiment of the present invention, image data to be transmitted to another information processing device is encoded to generate a codestream. Whether or not main data of the codestream is to be transmitted is controlled on the basis of whether or not an amount of data of the generated codestream exceeds an allowable rate that is an upper limit value of a bitrate at which the codestream is flawlessly transmittable. In accordance with the control, the codestream is packetized into packets when the amount of data of the codestream does not exceed the allowable rate and only a header of the codestream is packetized when the amount of data of the codestream exceeds the allowable rate. The packets are transmitted to the another information processing device.

According to another embodiment of the present invention, a codestream transmitted from another information processing device is received. A header of the received codestream is analyzed. Whether or not data in the codestream is lost is determined on the basis of a result of the analysis. When it is determined that the data is lost, the lost data is recovered on the basis of information contained in the header. The codestream whose lost data was recovered is decoded or the codestream determined as a codestream without data loss is decoded.

According to the embodiments of the present invention, it is possible to perform efficient information processing. In particular, it is possible to suppress image-quality deterioration that occurs during transmission of image data.

BRIEF DESCRIPTION OF THE DRAWINGS

FIG. 19 is a block diagram showing a major configuration example of a personal computer according to an embodiment of the present invention.

DESCRIPTION OF THE PREFERRED EMBODIMENTS

Modes (hereinafter referred to as "embodiments") for carrying out the present invention will be described below.

[Configuration of Communication System]

Figure 1:
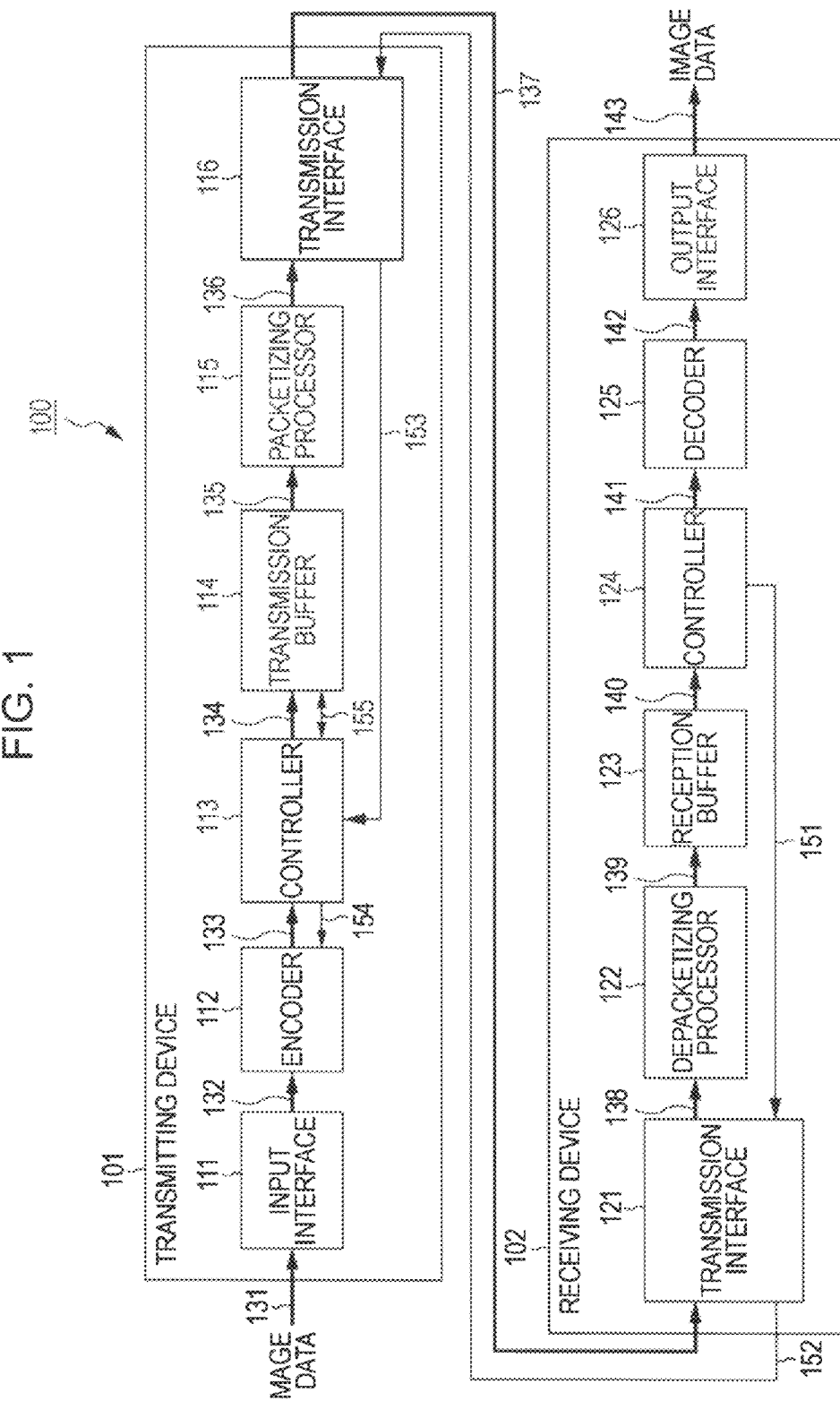
FIG. 1 is a block diagram showing a major configuration example of a communication system according to an embodiment of the present invention.

FIG. 1 is a block diagram showing a major configuration example of a communication system according to an embodiment of the present invention.

A communication system 100 shown in FIG. 1 includes a transmitting device 101 and a receiving device 102, which are interconnected through a transmission channel. The transmitting device 101 transmits image data to the receiving device 102 through the transmission channel.

The transmitting device 101 encodes input image data and transmits the encoded data to the receiving device 102 through the transmission channel. The transmitting device 101 includes an input interface (I/F) 111, an encoder 112, a controller 113, a transmission buffer 114, a packetizing processor 115, and a transmission interface (I/F) 116.

The input interface 111 receives the image data externally input to the transmitting device 101, as indicated by arrow 131, and supplies the received image data to the encoder 112, as indicated by arrow 132.

The encoder 112 encodes the input image data for each predetermined unit of data (e.g., for several lines) and supplies a resulting codestream to the controller 113, as indicated by arrow 133. The encoder 112 controls the rate of encoding in accordance with a target rate specified by rate-control information supplied from the controller 113.

The controller 113 controls whether or not main-data portion of the codestream generated by the encoder 112 is to be transmitted.

More specifically, for example, the controller 113 specifies a target rate of encoding processing to be performed by the encoder 112, on the basis of a feedback signal supplied from the receiving device 102, and supplies the target rate to the encoder 112 as rate control information, as indicated by arrow 154.

The controller 113 also monitors the transmission buffer 114, as indicated by left right arrow 155, and obtains amount-of-buffer information indicating the amount of data (the amount of buffer) of a codestream held in the transmission buffer 114. On the basis of the rate control information and the amount-of-buffer information, the controller 113 sets an allowable rate indicating the amount of data that can be held by the transmission buffer 114.

In addition, while performing control so that the amount of codestream to be transmitted does not exceed the allowable rate, the controller 113 supplies the codestream, supplied from the encoder 112, to the transmission buffer 114, as indicated by arrow 134.

The transmission buffer 114 temporarily holds the codestream supplied from the controller 113. On the basis of a request from the packetizing processor 115 or the like, the transmission buffer 114 supplies the held codestream to the packetizing processor 115 at a predetermined timing, as indicated by arrow 135.

As indicated by left right arrow 155, the transmission buffer 114 issues a notification indicating the amount-of-buffer information to the controller 113, in response to a request from the controller 113.

The packetizing processor 115 reads the codestream from the transmission buffer 114, packetizes the codestream into packets, and supplies the packets to the transmission interface 116, as indicated by arrow 136. During the processing, with respect to a portion determined to exceed the allowable rate of the codestream, the packetizing processor 115 packetizes only a header of the codestream and discards a main-data portion of the codestream.

The transmission interface 116 transmits the packets, supplied from the packetizing processor 115, to the receiving device 102 through the transmission channel, as indicated by arrow 137.

This transmission channel may be any channel and thus may be an in-device transmission channel, such as a PCI (peripheral component interconnect) bus. The transmission channel may also be a standardized cable, such as an IEEE (Institute of Electrical and Electronics Engineers) 1394 cable or a USB (universal serial bus) cable. In addition, the transmission channel may be a network, such as a LAN (local area network) or the Internet. The transmission channel may also be any other transmission channel. Needless to say, the image data may be transmitted through not only wired communication but also wireless communication. In the case of wireless communication, the transmission channel is space. In addition, the transmission channel may be a combination of multiple types of transmission channel.

The transmission interface 116 receives feedback information, transmitted from the receiving device 102, through the transmission channel. The transmission interface 116 supplies the received feedback information to the controller 113, as indicated by arrow 153. Needless to say, the feedback information may be packetized feedback information, in which case, an arbitrary method may be used for depacketizing the feedback information and is not described herein.

The receiving device 102 decodes the codestream supplied from the transmitting device 101 and outputs resulting image data. The receiving device 102 includes a transmission interface (I/F) 121, a depacketizing processor 122, a reception buffer 123, a controller 124, a decoder 125, and an output interface (I/F) 126.

The transmission interface 121 receives the codestream packets transmitted from the transmitting device 101 through the transmission channel. The transmission interface 121 supplies the received packets to the depacketizing processor 122, as indicated by arrow 138.

The transmission interface 121 transmits the feedback information, supplied from the controller 124, to the transmitting device 101 through the transmission channel, as indicated by arrow 152. The feedback information may be packetized for the transmission. Since an arbitrary method may be used for the packetizing, a description thereof is not given herein.

The depacketizing processor 122 depacketizes the packets supplied from the transmission interface 121 and extracts the codestream generated by the transmitting device 101. The depacketizing processor 122 supplies the extracted codestream to the reception buffer 123, as indicated by arrow 139, and causes the codestream to be held in the reception buffer 123.

The reception buffer 123 temporarily holds the codestream supplied from the depacketizing processor 122. On the basis of a request from the controller 124 or the like, the reception buffer 123 supplies the held codestream to the controller 124 at a predetermined timing, as indicated by arrow 140.

The controller 124 reads the codestream held in the reception buffer 123 and supplies the read codestream to the decoder 125, as indicated by arrow 141. At this point, the controller 124 detects data loss in the codestream and recovers data lost in the codestream, as appropriate.

The controller 124 also generates the feedback information indicating the data-loss state of the codestream, as appropriate, and supplies the feedback information to the transmission interface 121, as indicated by arrow 151. The feedback information is information that the transmitting device 101 uses to control the target rate and to determine the allowable rate, and is transmitted to the transmitting device 101 through the transmission interface 121.

Using a scheme corresponding to the encoding performed by the encoder 112, the decoder 125 decodes the codestream, supplied from the controller 124, to generate baseband image data. The decoder 125 supplies the generated baseband image data to the output interface 126, as indicated by arrow 142.

The output interface 126 supplies the baseband image data, supplied from the decoder 125, to outside of the receiving device 102, as indicated by arrow 143.

In the communication system 100 having a configuration as described above, when the bitrate of the codestream exceeds the upper limit value of the transmittable rate, the transmitting device 101 transmits only a header portion without transmitting a main-data portion of the codestream.

With this arrangement, the transmitting device 101 can suppress excessive consumption of the band in the transmission channel. That is, the transmitting device 101 can suppress consumption of a band used for packet retransmission and error correction for dealing with packet loss or the like that occurs in the transmission channel, thus making it possible to suppress a decrease in the playback image quality of a moving image.

Additionally, even when the communication system 100 plays back an image while transmitting image data therefor, the transmitting device 101 can suppress an increase in the amount of transmission by performing processing as described above. Thus, it is possible to suppress an increase in the amount of transmission delay. That is, the transmitting device 101 can transmit data in time for the image playback. With this arrangement, since an influence on subsequent data transmission is also reduced, the transmitting device 101 can suppress a decrease in the playback image quality of a moving image.

That is, the communication system 100 can suppress image-quality deterioration that occurs during transmission of image data.

The receiving device 102 not only plays back received image data, but also recover data lost in the codestream. The transmitting device 101, on the other hand, transmits the header portion to the receiving device 102, even when the bitrate of the codestream exceeds the upper limit value of the transmittable rate. Thus, with respect to a portion that is not transmitted by the transmitting device 101, the receiving device 102 can refer to the header of the portion.

That is, during data recovery, the receiving device 102 can refer to information that was contained in the header at the time of the encoding, and thus can more appropriately recover the data. Thus, the receiving device 102 can perform data recovery with an image that is closer to its original uncorrupted image. As a result, it can be expected that the playback image quality improves, compared to a case in which the transmitting device 101 simply transmits no codestream (i.e., transmits neither the header nor the data). That is, the communication system 100 can suppress image-quality deterioration that occurs during the transmission of image data.

The transmitting device 101 transmits the header, as described above, and thus, with respect to a corrupted codestream, the receiving device 102 can distinguish between a portion that is not transmitted by the transmitting device 101 and a portion that is lost by packet loss during transmission, on the basis of the presence/absence of the header.

As described above, the receiving device 102 reports (sends feedback of) a reception result (e.g., a state of data loss in the codestream) to the transmitting device 101. On the basis of the feedback control, the transmitting device 101 controls the target rate of the encoding. The transmitting device 101 also performs transmission control on the basis of the target rate and the amount of buffer.

There may be cases in which, even when a sufficient transmission band is available, the transmitting device 101 does not transmit a codestream for the reason that it does not keep up with the playback speed. In such a case, only data of a corresponding portion may be discarded and it is not necessary to reduce the target rate of next encoding.

However, when the receiving device 102 is unable to determine the reason of the corrupted codestream, the receiving device 102 reports an entire codestream loss to the transmitting device 101. That is, even when the transmitting device 101 does not transmit a codestream, the receiving device 102 sends a report to the transmitting device 101 as in the case of a loss during transmission. Upon receiving a report indicating a loss from the receiving device 102, the transmitting device 101 reduces the target rate of the encoding correspondingly. That is, this may lead to deterioration of the playback image quality.

However, as described above, the receiving device 102 can distinguish between a portion that is not transmitted by the transmitting device 101 and a portion that is lost by packet loss during transmission, on the basis of the presence/absence of the header transmitted by the transmitting device 101. Thus, the receiving device 102 stops reporting as to the portion that is not transmitted by the transmitting device 101 and reports, to the transmitting device 101, only a portion lost by packet loss during transmission. With this arrangement, the receiving device 102 enables the transmitting device 101 to suppress an excessive decrease in the target rate of the encoding. Consequently, it is possible to suppress a decrease in the playback image quality of a moving image.

That is, the communication system 100 can suppress image-quality deterioration that occurs during the transmission of image data.

Details of the individual elements will be described below.
[Encoder]

Figure 2:
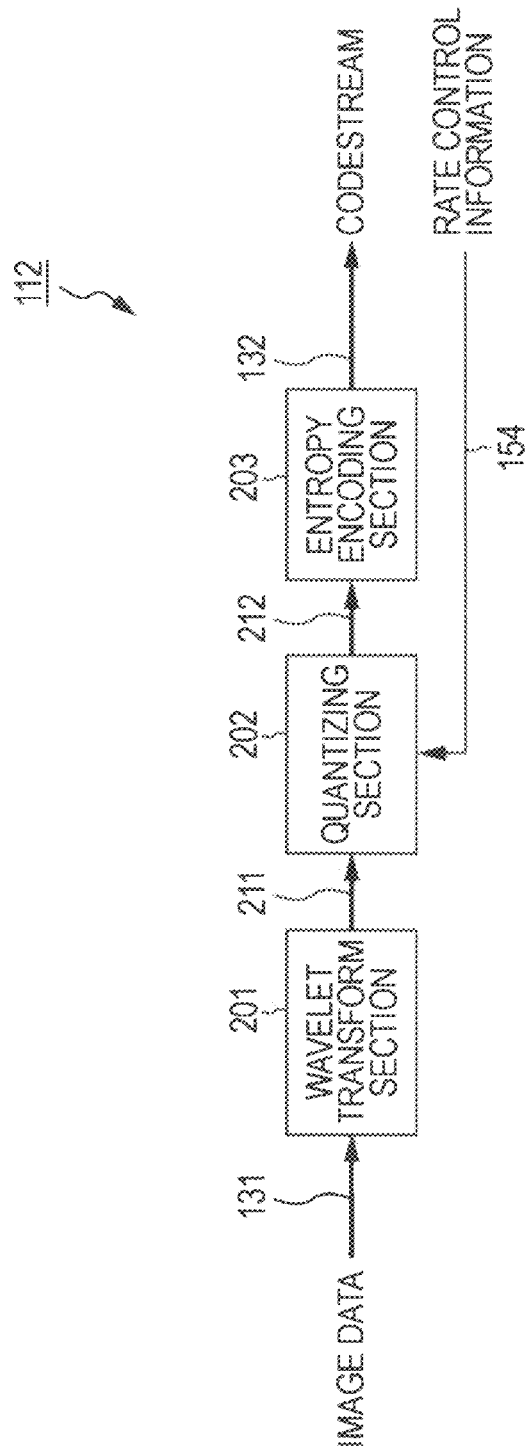
FIG. 2 is a block diagram showing a major configuration example of an encoder shown in FIG. 1.

FIG. 2 is a block diagram showing a major configuration example of the encoder shown in FIG. 1. As shown in FIG. 2, the encoder 112 includes a wavelet transform section 201, a quantizing section 202, and an entropy encoding section 203.

Image data of a precinct (current image) to be processed is supplied from the input interface 111 to the encoder 112, as indicated by arrow 131. The wavelet transform section 201 in the encoder 112 performs wavelet transform on the supplied image data.

The precinct is a unit of wavelet transform processing and is constituted by continuous lines (also referred to as a "line block" or a "slice") in a picture. Baseband image data used for generating, for at least one line, last-decomposition-level coefficients obtained by wavelet transform or coefficients of each hierarchical level (each subband) are collectively referred to as a "precinct" or a "line block".

The wavelet transform is processing in which analysis filter processing for decomposing input data into low frequency components and high frequency components is performed in both a horizontal direction and a vertical direction of a screen. In general, in discrete wavelet transform, one-dimensional wavelet convolution is performed on each horizontal pixel row to decompose an original image into two sub-images, i.e., a sub-image containing low-frequency information and a sub-image containing high-frequency information. In addition, through similar wavelet convolution performed on each vertical pixel column, each sub-image is further decomposed into two sub-images, i.e., a sub-image of low frequency information and a sub-image of high frequency information.

Figure 3:
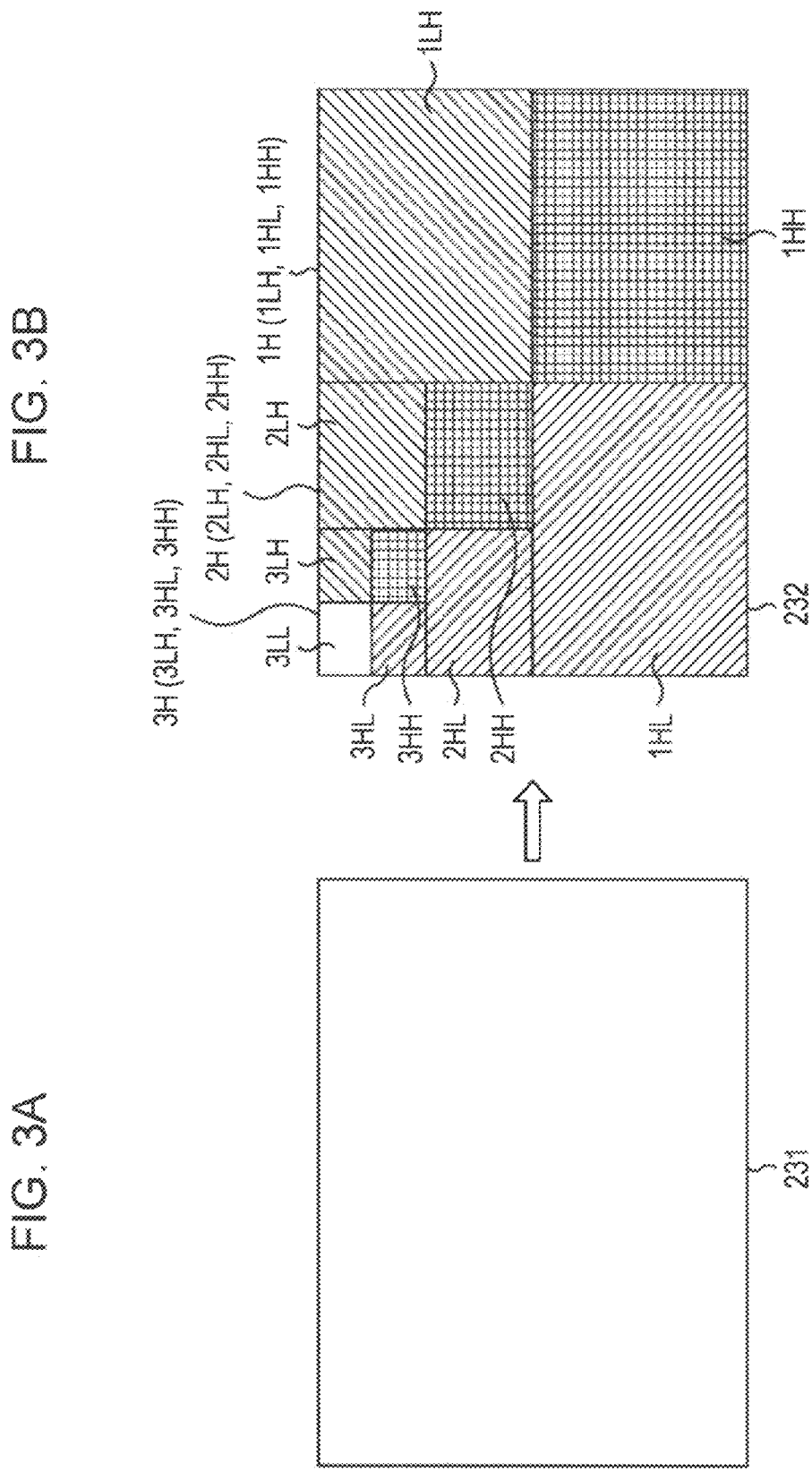
FIGS. 3A and 3B illustrate wavelet transform.

FIGS. 3A and 3B illustrate analysis filter processing. Baseband signals 231 for one frame shown in FIG. 3A are decomposed into four subbands, i.e., sub-images (HH, HL, LH, and LL), as post-transform signals 232 shown in FIG. 3B. The LL sub-image has both vertical and horizontal low-frequency components. The LH sub-image has horizontal low-frequency components and vertical high-frequency components. The HL sub-image has horizontal high-frequency components and vertical low-frequency components. The HH sub-image has both vertical and horizontal high-frequency components. Each sub-image has one-fourth the size of the original image and contains one-fourth as many data points as the original image.

Such analysis filter processing is repeatedly performed on the LL sub-image. For example, in FIGS. 3A and 3B, sub-images at a first decomposition level, the sub-images being obtained by performing wavelet transform on the original image, are referred to as 1HH, 1HL, 1LH, and 1LL (not shown). In this case, the 1LL sub-image is further subjected to wavelet transform and is decomposed into 2HH, 2HL, 2LH, and 2LL (not shown), which are sub-images at a second decomposition level. In addition, the 2LL sub-image is further subjected to wavelet transform and is decomposed into 3HH, 3HL, 3LH, and 3LL, which are sub-images at a third decomposition level. The wavelet transform is repeatedly performed as described above 4, so that the sub-images in the post-transform signals 232 have a hierarchical structure.

In this manner, in the wavelet transform, analysis filter processing for low-frequency components is recursively repeated to force data in a low-spatial-frequency band into smaller areas, thereby making it possible to achieve efficient compression encoding.

Line-based wavelet transform is processing in which wavelet transform as described above is performed using each line or multiple lines, not an entire image, as a unit of encoding.

Figure 4:
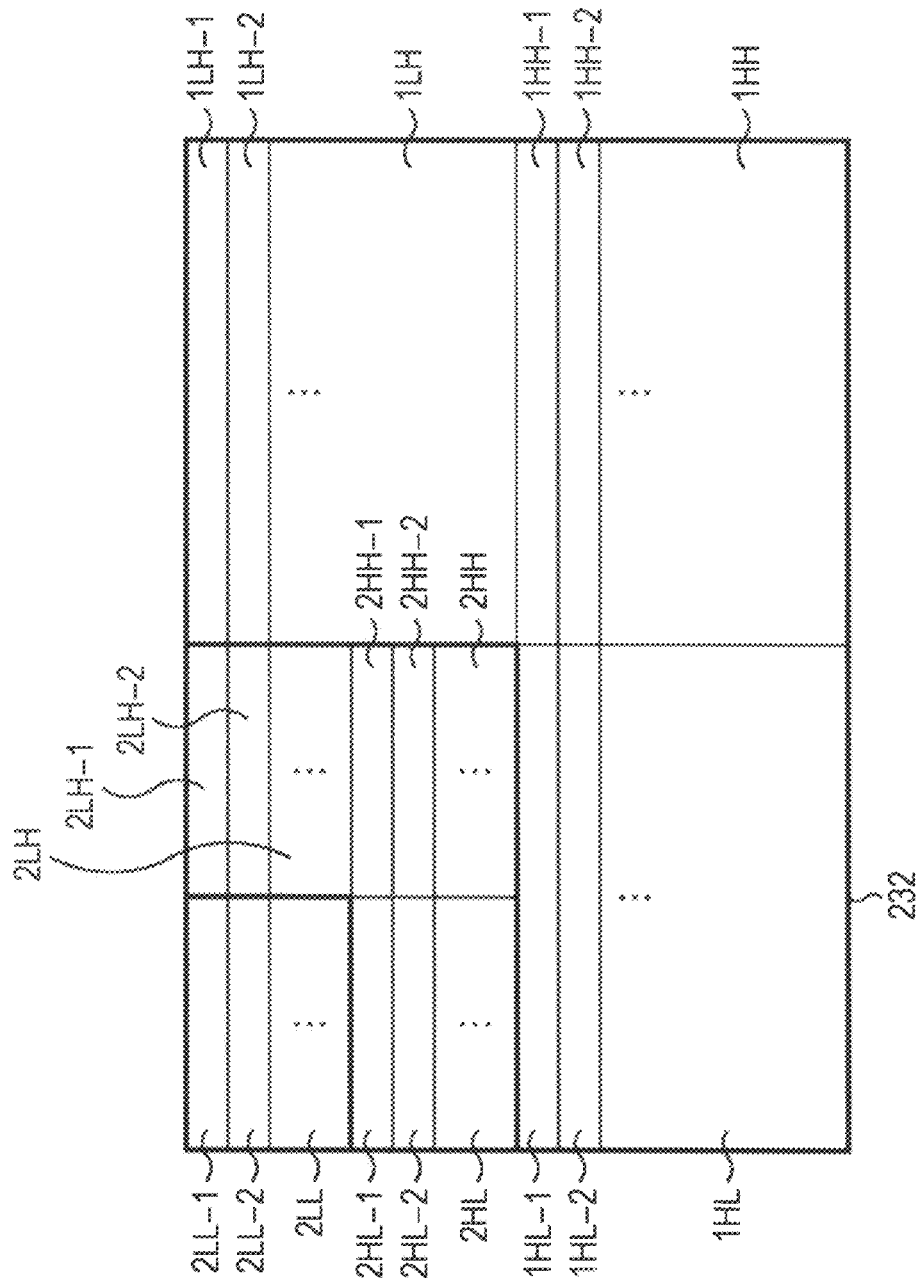
FIG. 4 illustrates subbands.

For example, lines of a portion of a baseband image are subjected to wavelet transform, so that 1LL-1 (not shown), 1LH-1, 1HL-1, and 1HH-1 are generated as in the post-transform signals 232 shown in FIG. 4. Further, 1LL-1 of the generated subbands is subjected to wavelet transform, so that 2LL-1, 2LH-1, 2HL-1, and 2HH-1 are generated.

As described above, a portion of an image is subjected to wavelet transform a predetermined number of times and then lines of a next portion are similarly subjected to wavelet transform, so that 1LL-2 (not shown), 1LH-2, 1HL-2, and 1HH-2 are generated. Further, 1LL-2 is subjected to wavelet transform, so that 2LL-2, 2LH-2, 2HL-2, and 2HH-2 are generated.

As described above, the wavelet transform is performed for each predetermined number of lines. The image data (wavelet coefficient data) resulting from the wavelet transform is sequentially encoded. That is, encoding is performed for each predetermined number of lines. Through encoding using a unit of encoding which is smaller than a frame image, the line-based wavelet transform reduces the amount of delay time involved in encoding and decoding and achieves a reduction in the amount of delay time during data transmission.

The number of lines of coefficient data of four subbands obtained by the analysis filter processing is smaller than the number of lines of coefficient data obtained before the processing. For example, when analysis filter processing is performed on coefficient data for N lines, four subbands, each having a number of lines (e.g., N/2 lines) which is smaller than N, are obtained.

Thus, in the example of FIG. 4, the number of lines in each of 1HL-1, 1LH-1, and 1HH-1 is larger than the number of lines in each of 2LL-1, 2HL-1, 2LH-1, and 2HH-1. Similarly, the number of lines in each of 1HL-2, 1LH-2, and 1HH-2 is larger than the number of lines in each of 2LL-2, 2HL-2, 2LH-2, and 2HH-2.

Subbands at the same decomposition level have the same number of lines. Thus, for example, 1HL-1, 1LH-1, and 1HH-1 have the same number of lines and 2LL-1, 2HL-1, 2LH-1, and 2HH-1 have the same number lines.

Figure 5B:
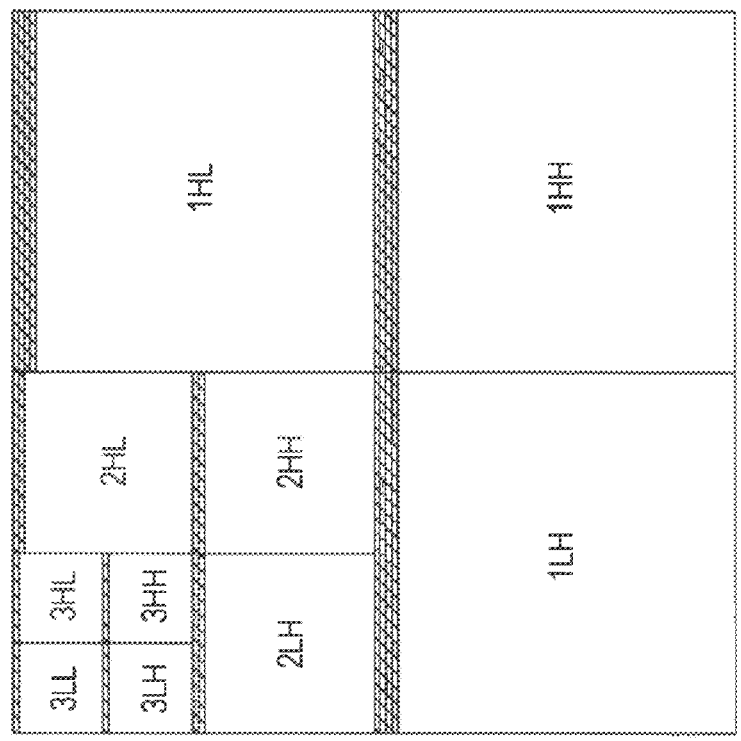
FIGS. 5A and 5B illustrate line-based wavelet transform.
Figure 5A:
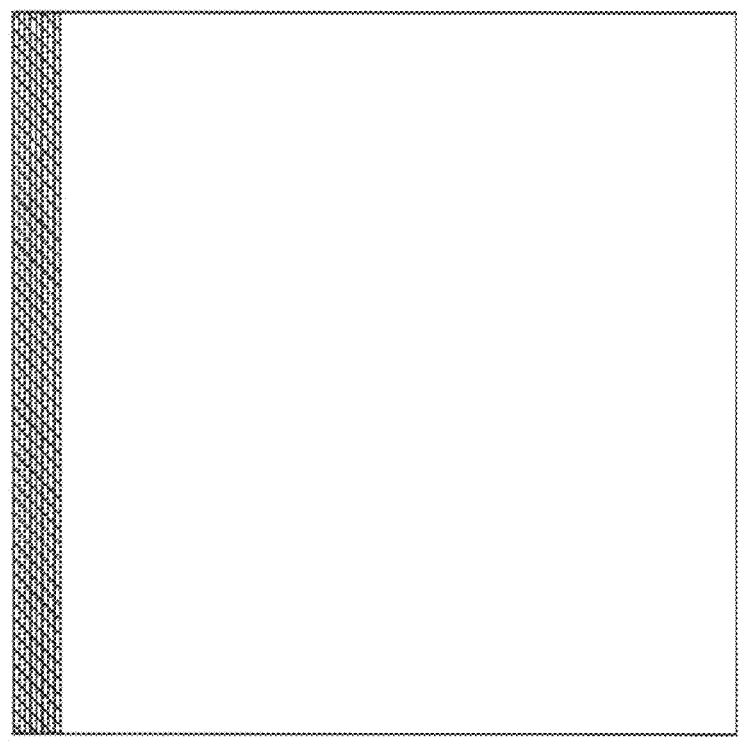

For example, it is assumed that, as a result of analysis filter processing, coefficient data for half the number of lines is obtained as the decomposition level is reduced by one level. In this case, when wavelet transform in the vertical direction is performed on eight lines of the baseband at the same time up to a decomposition level 3, as shown in FIG. 5A, one line is generated for each of subbands (3LL, 3HL, 3LH, and 3HH) at decomposition level 3, as shown in FIG. 5B. In this case, two lines are generated in each of the subbands (2HL, 2LH, and 2HH) at decomposition level 2 and four lines are generated in each of the subbands (1HL, 1LH, and 1HH) at decomposition level 1.

As described above, a collection of baseband pixel data used for generating lowest-frequency coefficient data for at least one line is referred to as a "precinct" or a "line block". For example, in the case of FIGS. 5A and 5B, eight lines (a hatched portion) shown in FIG. 5A correspond to one precinct. The precinct may also refer to a collection of coefficients (a collection of aligned units) in all subbands subjected to analysis filtering. For example, the precinct may refer to all hatched portions shown in FIG. 5B. The collection of the coefficient data is substantially the same as the collection (hatched portion) of the baseband image data shown in FIG. 5A.

The number of lines in one precinct in a picture does not necessarily have to be the same as that in another precinct.

Referring back to FIG. 2, the wavelet transform section 201 performs, for each precinct, wavelet transform as described above to generate coefficient data of each subband. The wavelet transform section 201 supplies the subband coefficient data to the quantizing section 202, as indicated by arrow 211.

The quantizing section 202 quantizes the component coefficients, generated by the wavelet transform section 201, by, for example, dividing the coefficients by a quantization step size, to thereby generate quantized coefficients. In this case, the quantizing section 202 can set the quantization step size for each precinct. The quantizing section 202 sets the quantization step size so as to achieve the target rate specified by the rate control information supplied from the controller 113. Since this precinct contains coefficients of all frequency components in a certain image area, performing quantization for each precinct makes it possible to utilize an advantage of multi-resolution analysis, which is a feature of the wavelet transform. Furthermore, since the above-described processing can be realized by merely determining the number of precincts on the entire screen, the amount of load for the quantization can also be reduced.

Additionally, since energy of image signals is typically concentrated at low-frequency components and there is a characteristic in that a deterioration in low frequency components is more noticeable for human eyes, it is effective to apply weighting for the quantization so that the quantization step size in subbands of low-frequency components has a small value. This weighting allows a relatively large amount of information to be allotted to low-frequency components, thus improving an overall subjective image quality.

The quantizing section 202 supplies the quantized coefficient data to the entropy encoding section 203, as indicated by arrow 212.

The entropy encoding section 203 performs source encoding on the quantized coefficients, generated by the quantizing section 202, to generate a compressed and encoded codestream. The source encoding may be implemented by, for example, Huffman encoding or higher-accuracy arithmetic encoding for use in a JPEG 2000 system.

In this case, on which range of coefficients entropy encoding is to be performed is a highly critical factor that is directly related to the compression efficiency. For example, in a JPEG system, 8×8 blocks are subjected to DCT (discrete cosine transform) and resulting 64 DCT coefficients are subjected to Huffman encoding to thereby compress information. That is, 64 DCT coefficients are in the range of the entropy encoding.

Unlike the DCT for 8×8 blocks, the wavelet transform section 201 performs wavelet transform for each line. Thus, the entropy encoding section 203 performs, for each precinct, source encoding in each frequency band (subband) independently from another frequency band. The entropy encoding section 203 supplies the resulting codestream to the controller 113, as indicated by arrow 132.

In the wavelet transform processing, the coefficient data of the subbands are generated in order of high-frequency components to low-frequency components. In contrast, in the inverse wavelet transform processing, coefficient data of the subbands are generated in order of low-frequency components to high-frequency components. Thus, in order to reduce the amount of delay time, the wavelet transform section 201 may rearrange the generated coefficient data so that the coefficient data of low frequency components are first supplied to the quantizing section 202.

[Controller]

Figure 6:
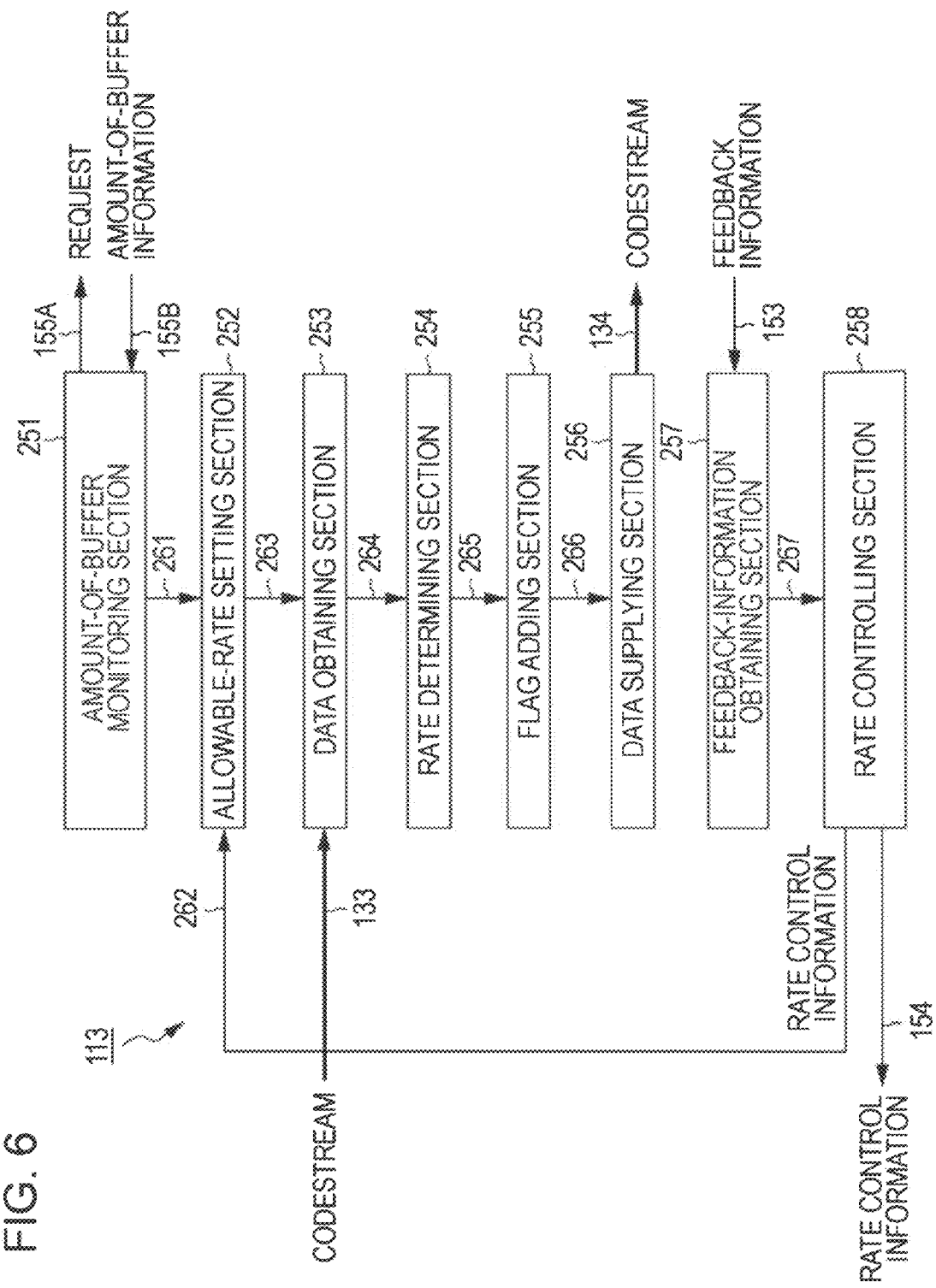
FIG. 6 is a block diagram showing a major configuration example of a controller in a transmitting device shown in FIG. 1.

FIG. 6 is a block diagram showing a major configuration example of the controller 113 in the transmitting device 101 shown in FIG. 1. As shown in FIG. 6, the controller 113 includes an amount-of-buffer monitoring section 251, an allowable-rate setting section 252, a data obtaining section 253, a rate determining section 254, a flag adding section 255, and a data supplying section 256.

As indicated by arrow 155A, the amount-of-buffer monitoring section 251 transmits a request to the transmission buffer 114 at a predetermined timing. As indicated by arrow 155B, the amount-of-buffer monitoring section 251 obtains amount-of-buffer information supplied, as a response to the request, from the transmission buffer 114. Arrows 155A and 155B correspond to left and right arrow 155 shown in FIG. 1.

The amount-of-buffer information indicates, at the current point in time, the amount of data of a codestream held in the transmission buffer 114. Such amount-of-buffer information may be obtained at any timing. For example, the amount-of-buffer information may be obtained at regular or irregular intervals. In general, it is desirable that the amount-of-buffer information be obtained at a frequency at which most recent information is obtained each time the encoder 112 processes a precinct. However, when the frequency of obtaining the amount-of-buffer information increases, the amount of load can also increase. Thus, an excessive increase of the frequency is not preferable.

The amount-of-buffer monitoring section 251 supplies the obtained amount-of-buffer information to the allowable-rate setting section 252, as indicated by arrow 261.

The allowable-rate setting section 252 sets the allowable rate on the basis of rate control information supplied from the rate controlling section 258 and the amount-of-buffer information supplied from the amount-of-buffer monitoring section 251.

The allowable rate indicates the upper limit value of a bitrate at which the codestream is flawlessly transmittable. As described above, the transmittable bitrate (transmission rate) of the transmission channel has an upper limit. Thus, the bitrate of the codestream has to be lower than or equal to the transmission rate. However, since the codestream being buffered is transferred first, the amount of delay time increases as the amount of buffer becomes large. Thus, in order to prevent the transmission speed from becoming lower than the playback speed (i.e., in order to reduce the amount of delay time), the bitrate of the codestream has to be reduced as the amount of buffer increases.

The term "allowable rate" as used herein refers to the upper-limit value of the codestream bitrate (data volume) at which the codestream is (flawlessly) transmittable in time for receiving-end processing, such as playback processing and decoding processing, as described above, without causing any decline in the performance of packet retransmission, error correction, and so on.

That is, the allowable rate is determined based on the amount of buffer and the target rate (i.e., the upper-limit value of the transmittable bitrate of the transmission channel), which is indicated by the rate control information and which has a target value of the amount of code in the encoding processing. For example, the allowable-rate setting section 252 may pre-hold table information from which the allowable rate is determined based on the target rate and the amount of buffer. In this case, by referring to the table information, the allowable-rate setting section 252 can obtain the allowable rate corresponding to the input target rate and amount of buffer.

For example, the allowable-rate setting section 252 may pre-hold a predetermined function from which the allowable rate is determined based on the target rate and the amount of buffer. In such a case, on the basis of the function, the allowable-rate setting section 252 can determine the allowable rate by using the input target rate and amount of buffer as variables. Needless to say, another method may be used. A method for determining the allowable rate may be any method for determining it on the basis of the target rate and the amount of buffer.

The allowable-rate setting section 252 supplies the allowable rate, determined as described above, to the rate determining section 254 via the data obtaining section 253, as indicated by arrows 263 and 264.

As indicated by arrow 133, the data obtaining section 253 obtains the codestream supplied from the encoder 112. As indicated by arrow 264, the data obtaining section 253 supplies the codestream, obtained from the encoder 112, together with the allowable rate obtained from the allowable-rate setting section 252, to the rate determining section 254.

The rate determining section 254 compares the amount of data of the codestream, obtained by the data obtaining section 253, with the allowable rate to determine whether or not the amount of data of the codestream exceeds the allowable rate. In this case, the codestream is obtained at generally regular intervals, and thus, the amount of data of the codestream is equivalent to a rate.

As indicated by arrow 265, the rate determining section 254 supplies a result of the determination (a result of the comparison), together with the codestream, to the flag adding section 255.

When the rate determining section 254 determines that the amount of data of the codestream exceeds the allowable rate, the flag adding section 255 adds, to the header of the codestream, an incomplete flag indicating that transfer is prohibited.

As described below, the packetizing processor 115 uses the incomplete flag to determine whether or not a main-data portion of the codestream is to be transmitted. With respect to a portion for which the incomplete flag is not set in the codestream, the packetizing processor 115 performs control so as to transmit main data of the portion to the receiving device 102, and with respect to a portion for which the incomplete flag is set in the codestream, the packetizing processor 115 discards the main data of the codestream and transmits only the header portion of the codestream to the receiving device 102.

The incomplete flag is also referred to by the controller 124 in the receiving device 102, as described below. On the basis of the presence/absence of the incomplete flag, the controller 124 performs control as to whether or not to report data loss.

The incomplete flag may be added to any position in the header. Since it is sufficient for information of the incomplete flag to indicate only whether the flag is set or not, the information may have at least one bit.

The incomplete flag may be added at any intervals. For example, the incomplete flag may be added for each precinct, may be added for each decomposition level, or may be added for each subband. In other words, the rate determining section 254 can make the determination at any timing.

For example, the arrangement may be such that the rate determining section 254 makes the determination for each subband and the flag adding section 255 performs, for each subband, incomplete-flag adding work (including both the determination as to whether or not to add the incomplete flag and the processing for actually adding the incomplete flag in accordance with a result of the determination). For example, the arrangement may also be such that the rate determining section 254 makes the determination for each subband and the flag adding section 255 performs the incomplete-flag adding work for each precinct.

That is, in such a case, all results of the determinations for the precincts are collectively added to a header for the precincts. Thus, by referring to the header portion, the packetizing processor 115 and the controller 124 can check the incomplete flags of all subbands in the precincts. However, since the incomplete flags are concentrated in one portion, the risk of loss, such as packet loss, becomes high.

Frequently making the rate determination for each smaller unit makes it possible to more finely control whether or not the codestream is to be transmitted. In such a case, however, not only does the amount of load in the determination processing increase, but also the amount of data of the incomplete flag increases. The amount of load for control performed by the controller 124 in the receiving device 102 also increases. Thus, it is desired that the rate determination be made at an appropriate frequency.

As indicated by arrow 266, the flag adding section 255 supplies, to the data supplying section 256, the codestream having a header to which the incomplete flag is added in accordance with a result of the rate determination.

As indicated by arrow 134, the data supplying section 256 supplies the codestream, supplied from the flag adding section 255, to the transmission buffer 114 and causes the codestream to be held thereby.

As described above, at a stage before the codestream is held by the transmission buffer 114, the controller 113 determines whether or not the codestream (the main data portion thereof) is to be transmitted. In contrast, it is also possible to employ a method in which the codestream is temporarily held by the transmission buffer 114 and whether or not the codestream (the main data portion thereof) is to be transmitted is determined at the time when it is output. However, such a method involves, immediately before the transmission, checking the amount of data to be transmitted and the amount of time that remains until playback and determining whether or not the transmission is to be performed. Correspondingly, the amount of delay time increases. Such an increase in the amount of delay time can be reduced as a result of the controller 113 determining whether or not the transmission is to be performed.

The description herein is given of a case in which the storage capacity of the transmission buffer 114 is assumed to be basically infinite with no particular consideration given thereto. In practice, however, the storage capacity of the transmission buffer 114 is finite. When the storage capacity is not sufficiently large, the storage capacity has to be generally taken into account.

For example, even in a case in which the determined allowable rate is high, when the free space of the transmission buffer 114 is smaller than the allowable rate, the codestream exceeding the free space is not held in the transmission buffer 114. In such a case, the arrangement may be such that the data supplying section 256 causes only the header to be held in the transmission buffer 114 and discards the main-data portion.

For example, the arrangement may also be such that, with respect to a portion for which the incomplete flag is set, the data supplying section 256 discards all main data of the portion and causes only the header to be held in the transmission buffer 114.

In such a case, it can be expected that the amount of data held in the transmission buffer 114 is reduced. Thus, since the storage capacity used for the transmission buffer 114 is reduced, cost can be reduced. In such a case, however, since only a portion, i.e., only the header, is held in the transmission buffer 114, the structure of the data held in the transmission buffer 114 can become complicated. Thus, the read processing performed by the packetizing processor 115 can become complicated, the amount of load can increase, and the amount of delay can increase.

When the data supplying section 256 discards all main data with respect to a codestream portion that is not to be transmitted and causes the header thereof to be held in the transmission buffer 114, as in the latter case described above, the packetizing processor 115 can determine whether or not the codestream is to be transmitted, in accordance with the presence/absence of the main data. This arrangement, therefore, can eliminate the incomplete flag. In addition, in accordance with the presence/absence of the main data, the controller 124 in the receiving device 102 can also identify whether the codestream was not transmitted by the transmitting device 101 or a loss occurred during transmission. In general, however, checking the presence of an incomplete flag added to a predetermined position in a header is simpler and more accurate rather than checking a header and checking the presence/absence of main data. Simplified processing leads to a reduction in the amount of load, thus suppressing an increase in the amount of delay time.

As described above, through the use of the incomplete flag, the transmitting device 101 can easily control whether or not the codestream is to be transmitted. Consequently, it is possible to suppress a decrease in the playback image quality of a moving image.

That is, the communication system 100 can more easily suppress image-quality deterioration that occurs during the transmission of image data.

The controller 113 has a feedback-information obtaining section 257 in addition to the rate controlling section 258.

The feedback-information obtaining section 257 obtains feedback information supplied from the receiving device 102 via the transmission interface 116. The feedback-information obtaining section 257 supplies the obtained feedback information to the rate controlling section 258, as indicated by arrow 267.

The feedback information reports a codestream data loss due to packet loss or the like that occurs in the transmission channel. The rate controlling section 258 determines a target rate for the encoding processing to be performed by the encoder 112, on the basis of the feedback information supplied from the feedback-information obtaining section 257, and supplies rate control information indicating the target rate to the encoder 112, as indicated by arrow 154.

For example, when it is determined based on the feedback information that the amount of loss in the codestream is large, the rate controlling section 258 reduces the target rate. When it is determined that the amount of loss in the codestream is small or zero, the rate controlling section 258 increases the target rate. A specific way of controlling the target rate with respect to a certain level of loss in the codestream is arbitrary. For example, a predetermined function and/or a conversion table may be prepared, so that the rate controlling section 258 performs control using the function and/or the table.

The rate controlling section 258 also supplies the rate control information to the allowable-rate setting section 252, as indicated by arrow 262.

[Packetizing Processor]

Figure 7:
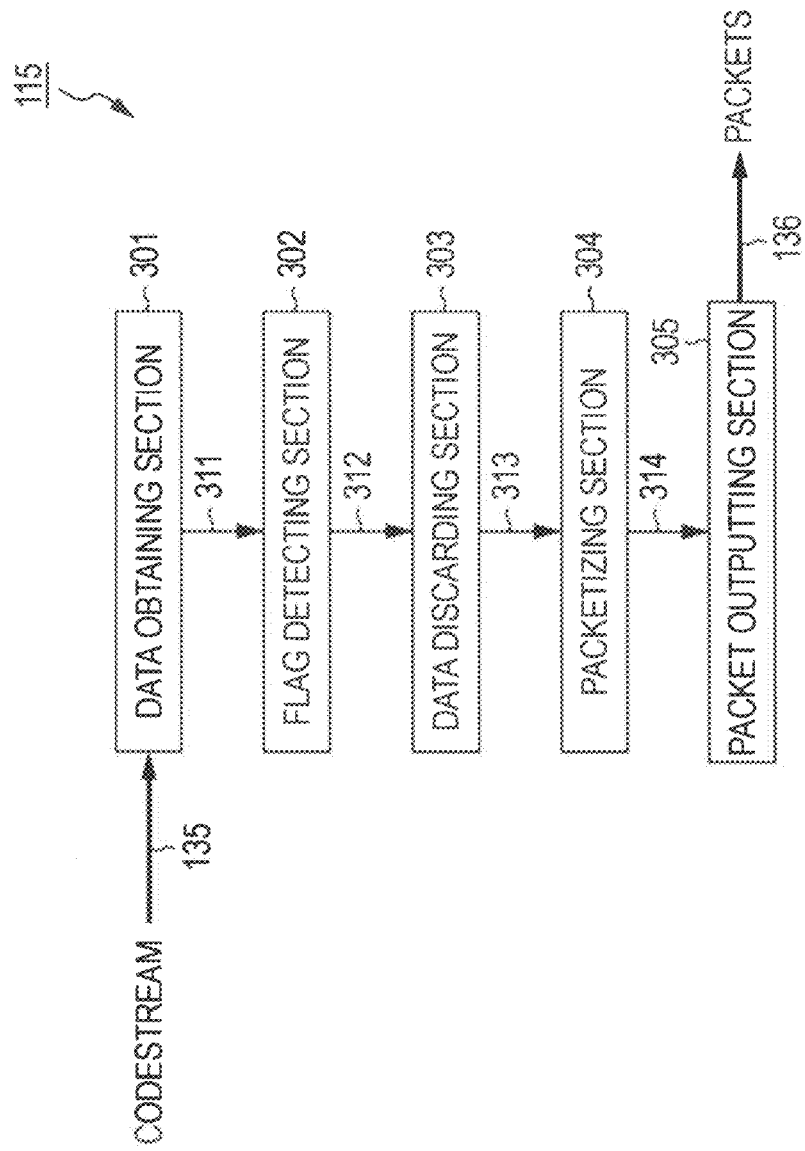
FIG. 7 is a block diagram showing a major configuration example of a packetizing processor shown in FIG. 1.

FIG. 7 is a block diagram showing a major configuration example of the packetizing processor shown in FIG. 1. As shown in FIG. 7, the packetizing processor 115 includes a data obtaining section 301, a flag detecting section 302, a data discarding section 303, a packetizing section 304, and a packet outputting section 305.

As indicated by arrow 135, the data obtaining section 301 obtains a predetermined amount of codestream from the transmission buffer 114 at a predetermined timing. For example, the data obtaining section 301 obtains the codestream for each precinct at timing corresponding to the transmission rate. As indicated by arrow 311, the data obtaining section 301 supplies the obtained codestream to the flag detecting section 302.

The flag detecting section 302 refers to the header of the codestream, obtained by the data obtaining section 301, to detect an incomplete flag. As indicated by arrow 312, the flag detecting section 302 supplies, to the data discarding section 303, the codestream on which the flag detection was performed and a result of the flag detection.

When the flag detecting section 302 detects an incomplete flag, the data discarding section 303 discards a portion contained in the codestream and associated with the header and supplies the remaining portion to the packetizing section 304, as indicated by arrow 313.

The packetizing section 304 packetizes the codestream, supplied from the data discarding section 303, into packets. As indicated by arrow 314, the packetizing section 304 supplies the generated packets to the packet outputting section 305. As indicated by arrow 136, the packet outputting section 305 outputs the supplied packets to the transmission interface 116.

As described above, the transmitting device 101 encodes image data, packetizes the resulting codestream into packets, and transmits the packets to the receiving device 102.

[Controller]

Details of the controller in the receiving device 102 will be described next.

Figure 8:
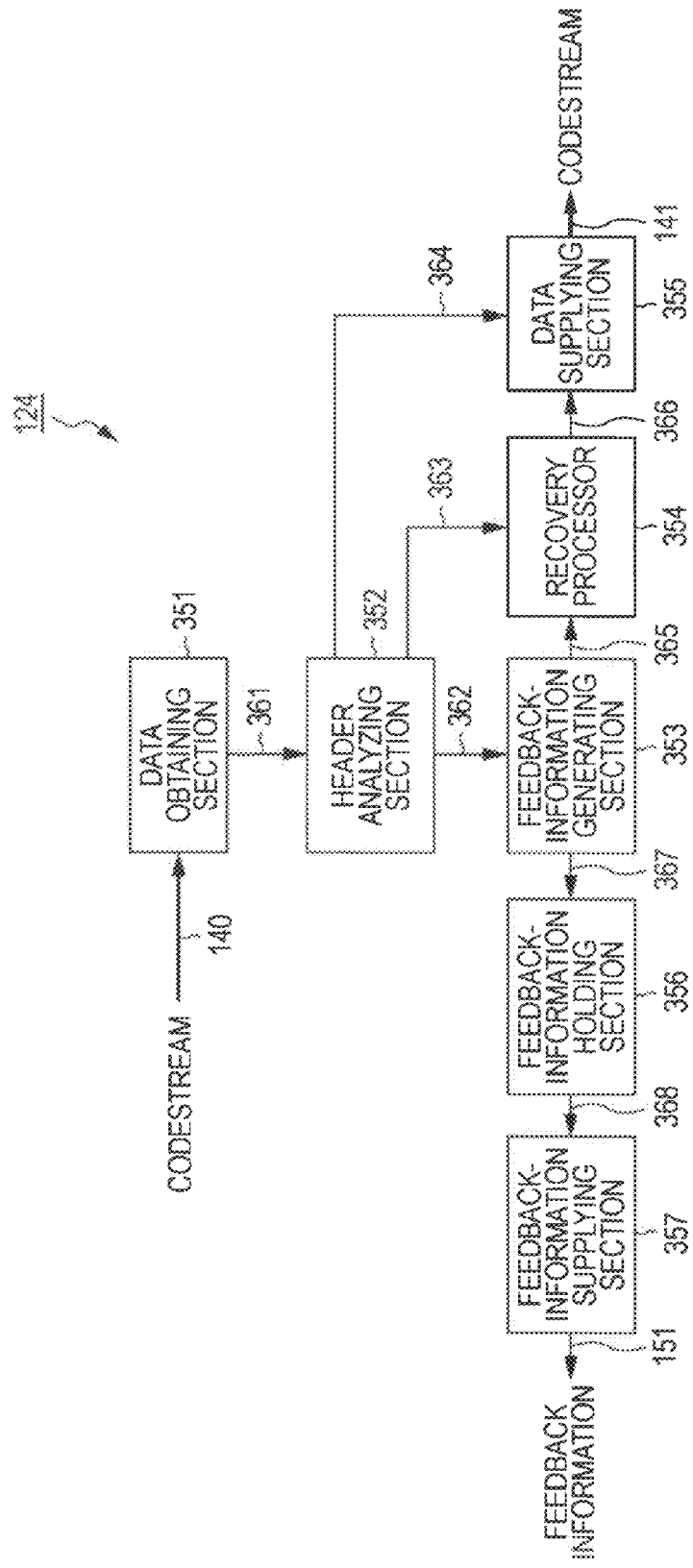
FIG. 8 is a block diagram showing a major configuration example of a controller in a receiving device shown in FIG. 1.

FIG. 8 is a block diagram showing a major configuration example of the controller 124 in the receiving device 102 shown in FIG. 1. As shown in FIG. 8, the controller 124 includes a data obtaining section 351, a header analyzing section 352, a feedback-information generating section 353, a recovery processor 354, a data supplying section 355, a feedback-information holding section 356, and a feedback-information supplying section 357.

As indicated by arrow 140, the data obtaining section 351 obtains the codestream, held in the reception buffer 123, for each predetermined amount of data at a predetermined timing. For example, the data obtaining section 351 reads, for each precinct, the codestream at such time intervals that the rate corresponds to the processing speed of the decoding processing performed by the decoder 125. As indicated by arrow 361, the data obtaining section 351 supplies the read codestream to the header analyzing section 352.

The header analyzing section 352 analyzes the header of the codestream supplied from the data obtaining section 351 and first checks whether or not data is lost. For example, on the basis of identification information or the like in the header, the header analyzing section 352 checks whether or not the codestream is continuous with the precinct processed last time and checks whether or not any data in the current precinct is lost.

The header analyzing section 352 checks whether or not an incomplete flag is set. The incomplete flag may be checked after data loss is checked or before data loss is checked.

When it is determined that data is lost and no incomplete flag is set, the header analyzing section 352 determines that the data loss occurred during transmission involving packet loss or the like. As indicated by arrow 362, the header analyzing section 352 supplies the codestream, together with information indicating that the data loss occurred, to the feedback-information generating section 353.

On the other hand, when it is determined that data is lost and an incomplete flag is set, the header analyzing section 352 determines that the data loss is due to the transmitting device 101 having not transmitted the codestream. As indicated by arrow 363, the header analyzing section 352 supplies the codestream to the recovery processor 354. Thus, in this case, the data loss is not reflected in the feedback information. That is, the data loss is not reported to the transmitting device 101. The transmitting device 101, therefore, does cause the target rate of the encoding processing to be reduced on the basis of the data loss.

As described above, when the header analyzing section 352 detects the incomplete flag, the data loss is not reflected in the feedback information. Thus, the receiving device 102 can suppress an excessive reduction in the target rate of the encoding. Consequently, the receiving device 102 can suppress a decrease in the playback image quality of a moving image. That is, the communication system 100 can suppress image deterioration that occurs during the transmission of image data.

In addition, when no data loss is found (naturally, when no incomplete flag is set), the header analyzing section 352 supplies the codestream to the data supplying section 355, as indicated by arrow 364, since it is not necessary to recover the data.

In response to a data-loss notification from the header analyzing section 352, the feedback-information generating section 353 reflects the data loss into the feedback information. For example, the feedback-information generating section 353 writes, to the feedback information, which part of data is lost and how much data is lost.

As indicated by arrow 367, the feedback-information generating section 353 supplies the generated feedback information to the feedback-information holding section 356. The feedback information may be supplied at an arbitrary timing. Feedback information for each precinct may be supplied to the feedback-information holding section 356 or feedback information for multiple precincts may be collectively supplied to the feedback-information holding section 356.

As indicated by arrow 365, the feedback-information generating section 353 supplies the codestream, supplied from the header analyzing section 352, to the recovery processor 354.

With respect to a codestream whose data is lost and which is supplied from the header analyzing section 352 or the feedback-information generating section 353, the recovery processor 354 recovers the lost portion by using prepared dummy data and/or adjacent codestream(s).

At this point, when the header of the lost portion is contained in the supplied codestream, the recovery processor 354 refers to information contained in the header and performs recovery processing on the basis of the information. For example, when the transmitting device 101 does not transmit a main-data portion, only the header is contained in the codestream, as described above. This header contains, for example, a quantization parameter of the quantizing processing performed by the quantizing section 202. In accordance with weighting of the quantization parameter, the recovery processor 354 performs processing, such as selecting data to be recovered. With this arrangement, the recovery processor 354 can perform recovery processing by using appropriate data that is more similar to the original image. Consequently, the receiving device 102 can suppress a decrease in the playback image quality of a moving image. That is, the communication system 100 can suppress image deterioration that occurs during the transmission of image data. Needless to say, the arrangement may be such that the recovery processor 354 performs recovery processing by referring to other information contained in the header.

As indicated by arrow 366, the recovery processor 354 supplies, to the data supplying section 355, the codestream data whose lost data was recovered. As indicated by arrow 141, the data supplying section 355 supplies the data-lossless codestream, supplied from the recovery processor 354 or the header analyzing section 352, to the decoder 125.

[Decoder]

Figure 9:
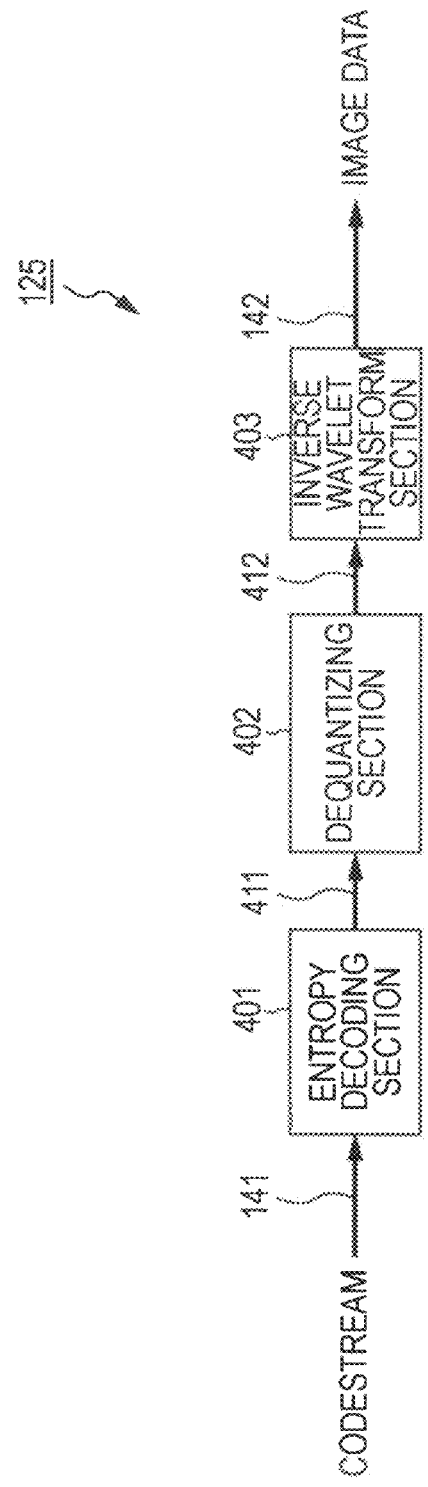
FIG. 9 is a block diagram showing a major configuration example of a decoder shown in FIG. 1.

FIG. 9 is a block diagram showing a major configuration example of the decoder shown in FIG. 1. As shown in FIG. 9, the decoder 125 includes an entropy decoding section 401, a dequantizing section 402, and an inverse wavelet transform section 403.

The entropy decoding section 401 performs source decoding on the codestream, supplied from the controller 124 as indicated by arrow 141, to generate quantized coefficient data. The source decoding may be implemented by Huffman decoding, high-efficiency arithmetic decoding, or the like in relation to the source encoding performed by the entropy encoding section 203. When the entropy encoding section 203 performs source encoding for P lines, the entropy decoding section 401 also performs source decoding for P lines in each subband independently from another subband. As indicated by arrow 411, the entropy decoding section 401 supplies the obtained quantized coefficient data to the dequantizing section 402.

The dequantizing section 402 dequantizes the quantized coefficient data, supplied from the entropy decoding section 401, by multiplying it by a quantization step size, to thereby generate wavelet coefficient data. The quantization step size is generally specified in the header or the like of the codestream as a quantization parameter or the like. When the quantizing section 202 has a quantization step size set for each precinct, the dequantizing section 402 also has a dequantization step size set for each precinct to perform dequantization. The dequantizing section 402 supplies the wavelet coefficient data, obtained by the dequantization, to the inverse wavelet transform section 403, as indicated by arrow 412.

The inverse wavelet transform section 403 performs processing, which is reverse of the processing performed by the wavelet transform section 201, on the wavelet coefficient data supplied from the dequantizing section 402. That is, the inverse wavelet transform section 403 performs, in both horizontal and vertical directions, filter processing (synthesis filter processing) on the coefficient data decomposed into multiple frequency bands by the wavelet transform section 201. In the synthesis filter processing, low frequency components and high frequency components are combined.

That is, in the synthesis filter processing, the coefficient data of four subbands (LL, HL, LH, and HH) are combined in a manner opposite to the analysis filter processing, so that coefficient data of one subband (or image data of the baseband) at a decomposition level that is higher by one level are generated.

The inverse wavelet transform processing is also performed in a line-based manner, as in the case of the wavelet transform. That is, when the wavelet transform section 201 performs wavelet transform for each precinct, the inverse wavelet transform section 403 also performs inverse wavelet transform for each precinct.

In the synthesis filter processing, the number of lines of one-subband coefficient data (or baseband image data) obtained from the synthesis filter processing is smaller than the number of lines of coefficient data obtained before the processing, as in the case of the analysis filter processing. For example, when synthesis filter processing is performed on coefficient data of N lines in each of four subbands, one subband (or the baseband) having the number of lines (e.g., N/2 lines) which is smaller than N is obtained.

Figure 10B:
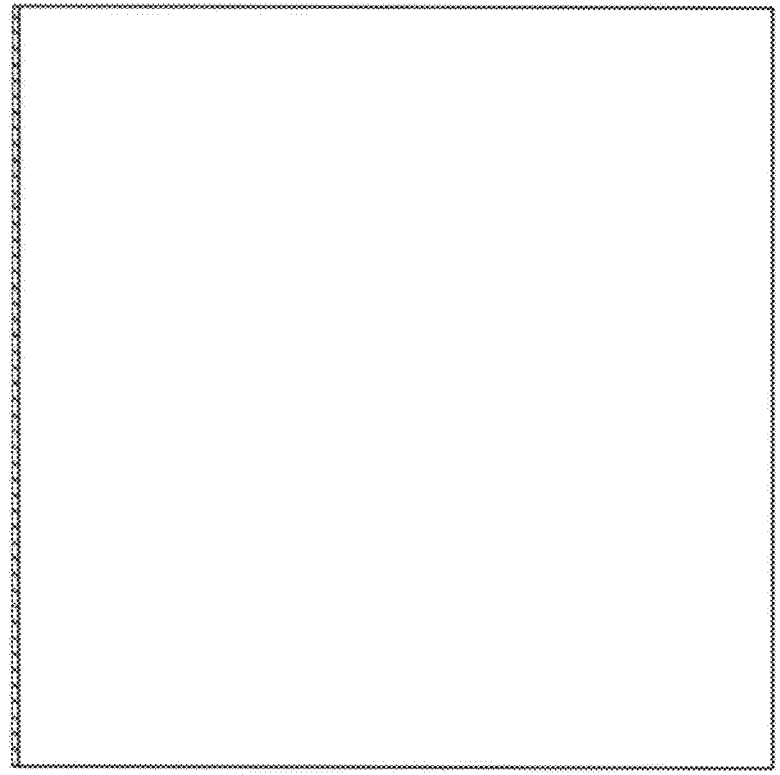
FIGS. 10A and 10B illustrate line-based inverse wavelet transform.
Figure 10A:
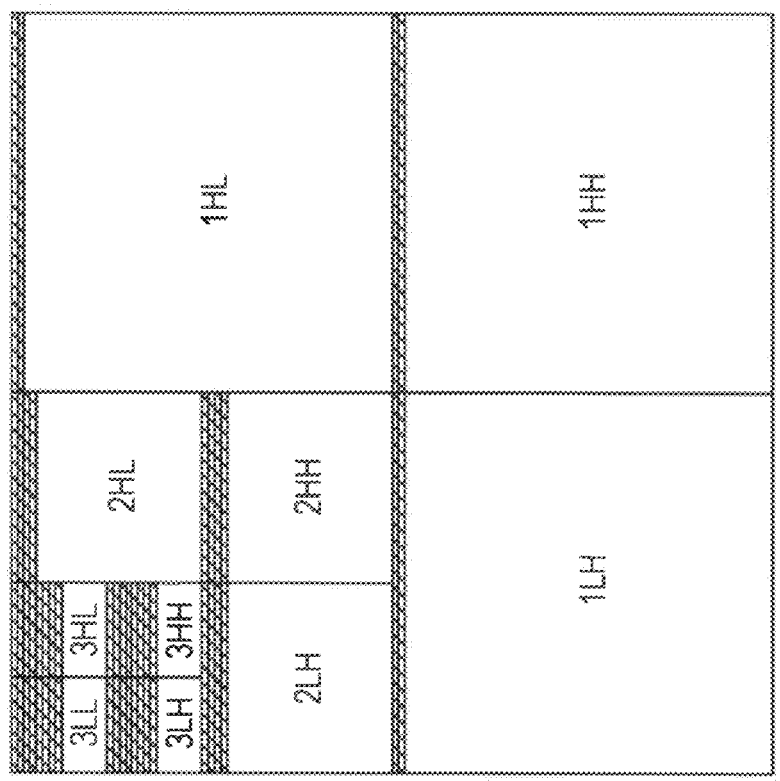

For example, it is assumed that, as a result of synthesis filter processing, coefficient data for half the number of lines is obtained as the decomposition level is increased by one level. In this case, when inverse wavelet transform is performed on eight lines in each subband at decomposition level 3, as shown in FIG. 10A, baseband image data for one line is generated as shown in FIG. 10B. In this case, as shown in FIG. 10A, four lines of each of subbands (2HL, 2LH, and 2HH) at decomposition level 2 and two lines in each of subbands (1HL, 1LH, and 1HH) at decomposition level 1 are necessary in addition to the subbands at decomposition level 3.

In the synthesis filter processing, for example, the hatched portion in each subband shown in FIG. 10A or one line (a hatched portion) shown in FIG. 10B corresponds to one precinct.

The inverse wavelet transform section 403 performs line-based inverse wavelet transform as described above to generate baseband image data. The inverse wavelet transform section 403 outputs the generated baseband image data to the output interface 126, as indicated by arrow 142.

As described above, the communication system 100 can suppress image-quality deterioration that occurs during transmission of image data.

Although the above-description has been given of a case in which the incomplete flag is added to the header of a codestream, the incomplete flag may be added to the header of a packet and be transmitted to the receiving device 102.

In such a case, however, information for locating, in the codestream, a position indicated by the incomplete flag may be necessary. The receiving device 102 may also have to analyze the information to locate the corresponding position in the codestream, thus involves complicated processing.

[Flow of Processing Executed by Transmitting Device]

A flow of various types of processing executed by the communication system 100 described above will be described next.

Figure 11:
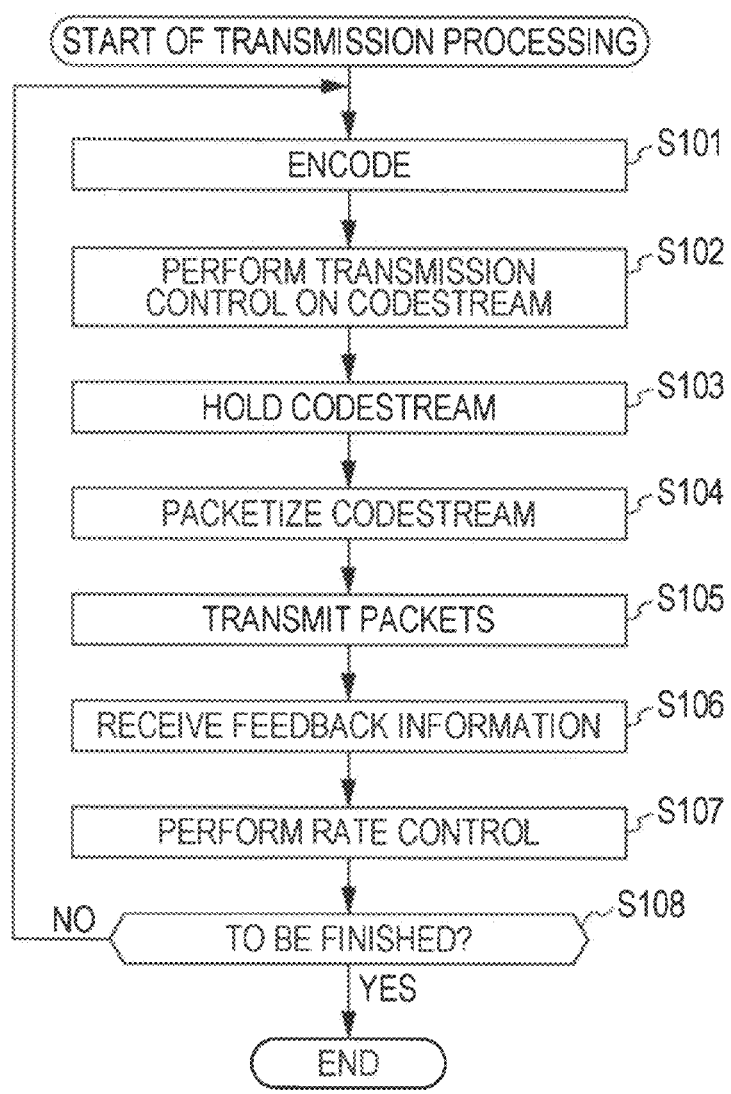
FIG. 11 is a flowchart illustrating an example of a flow of transmission processing.

First, an example of a flow of the transmission processing executed by the transmitting device 101 will be described with reference to a flowchart shown in FIG. 11.

Upon start of the transmission processing, in step S101, the encoder 112 encodes image data for one precinct, the image data being obtained from the input interface 111, to thereby generate a codestream. In step S102, the controller 113 performs transmission control for controlling whether or not the codestream generated in step S101 is to be transmitted. More specifically, the controller 113 determines whether or not the codestream is to be transmitted, on the basis of the allowable rate determined from the target rate and the amount of buffer, and performs processing, such as adding an incomplete flag to the header of the codestream.

In step S103, the transmission buffer 114 temporarily holds the codestream. In step S104, the packetizing processor 115 reads the codestream from the transmission buffer 114 at a predetermined timing and packetizes the read codestream into packets. In step S105, the transmission interface 116 transmits the packets to the receiving device 102 through the transmission channel.

In step S106, the transmission interface 116 receives feedback information transmitted from the receiving device 102. In step S107, the controller 113 performs rate control on the basis of the feedback information received in the processing in step S106.

In step S108, the encoder 112 determines whether or not the transmission processing is to be finished. When it is determined that the transmission processing is not to be finished, the process returns to step S101 and the subsequent processing is repeated. When it is determined in step S108 that the transmission processing is to be finished, the transmission processing ends.

Figure 12:
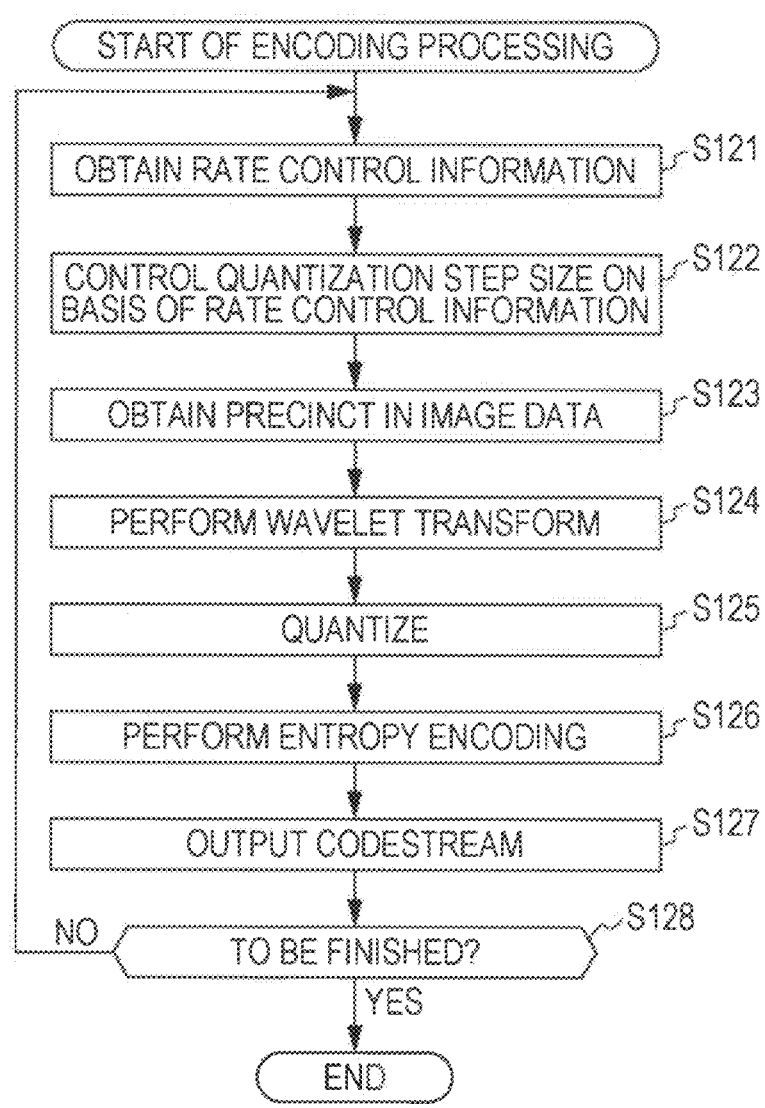
FIG. 12 is a flowchart illustrating an example of a flow of encoding processing.

The encoding processing executed in step S101 in FIG. 11 will be described next in more detail. An example of a flow of the encoding processing performed by the encoder 112 will now be described with reference to a flowchart shown in FIG. 12.

Upon start of the encoding processing, in step S121, the quantizing section 202 obtains the rate control information. In step S122, the quantizing section 202 controls the quantization step size on the basis of the rate control information.

In step S123, the wavelet transform section 201 obtains, in the image data, a precinct to be processed. In step S124, the wavelet transform section 201 performs wavelet transform on the precinct, obtained in the processing in step S123, to generate wavelet coefficient data for each subband.

In step S125, by using the quantization step size controlled in the processing in step S122, the quantizing section 202 quantizes the wavelet coefficients generated in the processing in step S124.

In step S126, the entropy encoding section 203 performs entropy encoding on the quantized coefficient data. In step S127, the entropy encoding section 203 outputs a codestream.

In step S128, the quantizing section 202 determines whether or not the encoding processing is to be finished. When it is determined that the encoding processing is not to be finished, the process returns to step S121 and the subsequent processing is performed. When it is determined in step S128 that the encoding processing is to be finished, the encoding processing ends.

Figure 13:
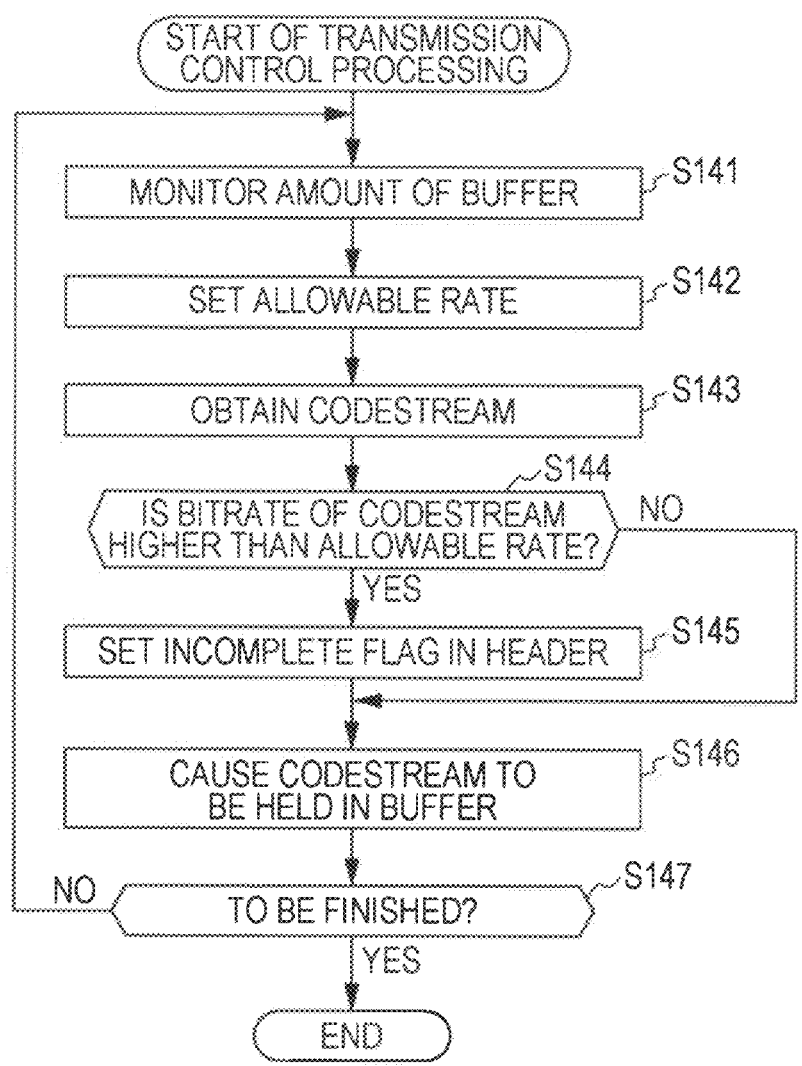
FIG. 13 is a flowchart illustrating an example of a flow of transmission control processing.

The transmission control processing executed in step S102 in FIG. 11 will be described next in more detail. An example of a flow of the transmission control processing performed by the controller 113 will now be described with reference to a flowchart shown in FIG. 13.

Upon start of the transmission control processing, in step S141, the amount-of-buffer monitoring section 251 monitors the amount of data (the amount of buffer) of the codestream stored in the transmission buffer 114 and obtains amount-of-buffer information. In step S142, the allowable-rate setting section 252 sets the allowable rate on the basis of the rate control information and the amount-of-buffer information.

In step S143, the data obtaining section 253 obtains the codestream. In step S144, the rate determining section 254 determines whether or not the bitrate of the codestream is higher than the allowable rate set in the processing in step S142. When it is determined that the bitrate of the codestream is higher than the allowable rate, the process proceeds to step S145.

In step S145, the flag adding section 255 sets an incomplete flag in the header contained in the codestream. Upon completion of the processing in step S145, the process proceeds to step S146. When it is determined in step S144 that the bitrate of the codestream is not higher than the allowable rate, the processing in step S145 is skipped and the process proceeds to step S146.

In step S146, the data supplying section 256 causes the codestream to be held in the transmission buffer 114.

In step S147, the amount-of-buffer monitoring section 251 determines whether or not the data control processing is to be finished. When it is determined that the data control processing is not to be finished, the process returns to step S141 and the subsequent processing is repeated. When it is determined in step S147 that the data control processing is to be finished, the transmission control processing ends.

Figure 14:
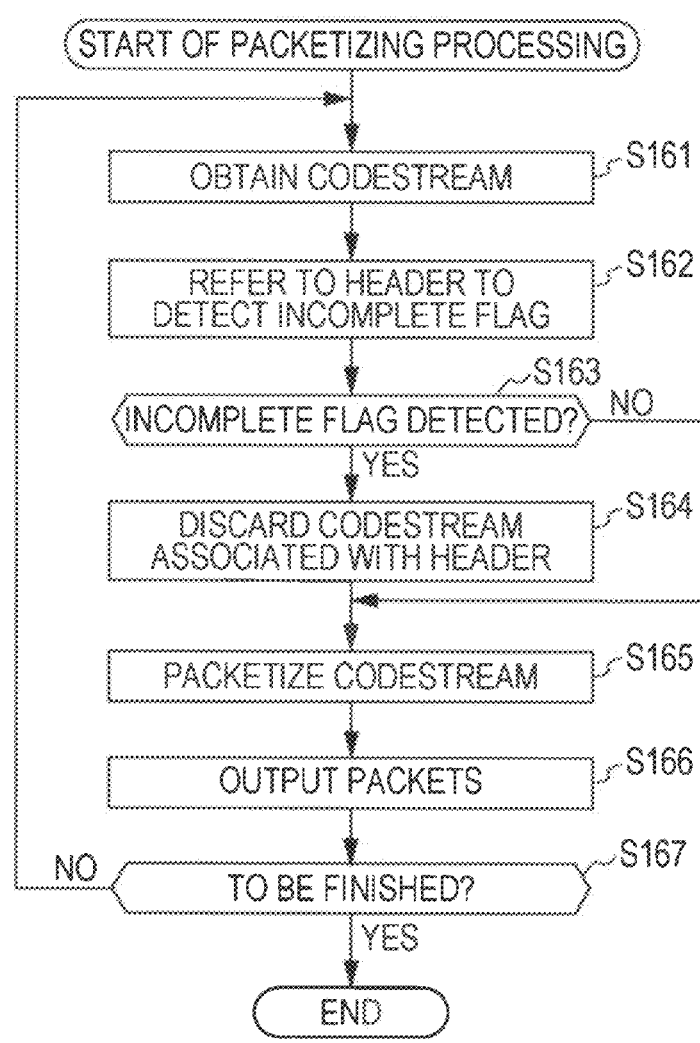
FIG. 14 is a flowchart illustrating an example of a flow of packetizing processing.

The packetizing processing executed in step S104 in FIG. 11 will be described next in more detail. An example of a flow of the packetizing processing performed by the packetizing processor 115 will now be described with reference to a flowchart shown in FIG. 14.

Upon start of the packetizing processing, in step S161, the data obtaining section 301 obtains, from the transmission buffer 114, a codestream for each predetermined unit of processing.

In step S162, the flag detecting section 302 refers to the header of the codestream to detect an incomplete flag. In step S163, the flag detecting section 302 determines whether or not an incomplete flag is detected. When it is determined that an incomplete flag is detected, the process proceeds to step S164.

In step S164, the data discarding section 303 discards main data contained in the codestream and associated with the header in which the incomplete flag is set. After the main data is discarded, the process proceeds to step S165. On the other hand, when it is determined in step S163 that no incomplete flag is detected, the process proceeds to step S165.

In step S165, the packetizing section 304 packetizes the codestream into packets. In step S166, the packet outputting section 305 outputs the packets generated in the processing in step S165.

In step S167, the data obtaining section 301 determines whether or not the packetizing processing is to be finished. When it is determined that the packetizing processing is not to be finished, the process returns to step S161 and the subsequent processing is repeated. When it is determined in step S167 that the packetizing processing is to be finished, the packetizing processing ends.

Figure 15:
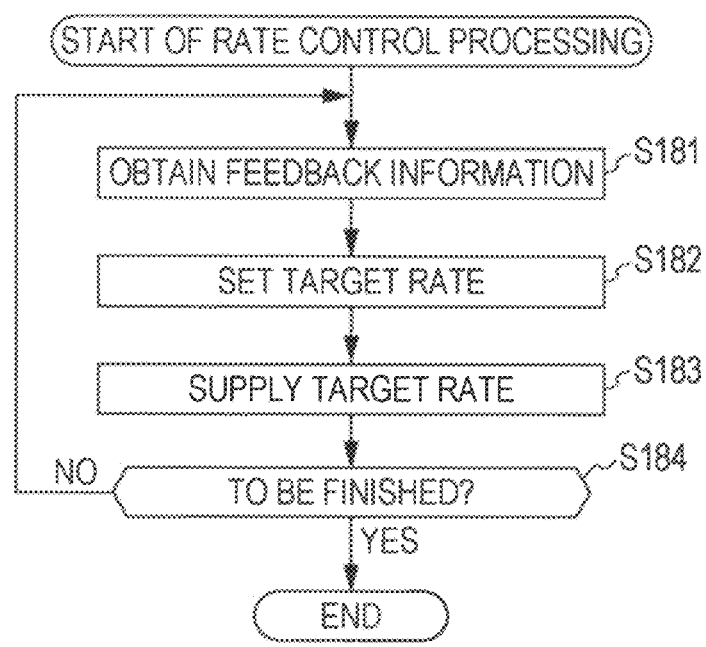
FIG. 15 is a flowchart illustrating an example of a flow of rate control processing.

The rate control processing executed in step S107 in FIG. 11 will be described next in more detail. First, an example of a flow of the rate control processing executed by the controller 113 in FIG. 6 will be described with reference to a flowchart shown in FIG. 15.

Upon start of the rate control processing, in step S181, the feedback-information obtaining section 257 obtains the feedback information. In step S182, the rate controlling section 258 sets a target rate of the encoding to be performed by the encoder 112, on the basis of the feedback information obtained in the processing in step S181.

In step S183, the rate controlling section 258 supplies the target rate to the encoder 112 as rate control information. Similarly, the rate controlling section 258 also supplies the rate control information to the allowable-rate setting section 252.

In step S184, the feedback-information obtaining section 257 determines whether or not the rate control processing is to be finished. When it is determined that the rate control processing is not to be finished, the process returns to step S181 and the subsequent processing is repeated. When it is determined in step S184 that the rate control processing is to be finished, the rate control processing ends.

Through the various types of processing as described above, the transmitting device 101 can suppress a decrease in the playback image quality of a moving image. That is, the communication system 100 can suppress image-quality deterioration that occurs during transmission of image data.

[Flow of Processing Executed by Receiving Device]

An example of a flow of the processing executed by the receiving device 102 will be described next. First, an example of a flow of the reception processing performed by the receiving device 102 will be described with reference to a flowchart shown in FIG. 16.

Upon start of the reception processing, in step S201, the transmission interface 121 receives the packets transmitted from the transmitting device 101. In step S202, the depacketizing processor 122 extracts the codestream from the packets received in the processing in step S201. In step S203, the reception buffer 123 holds the codestream.

In step S204, the controller 124 reads the codestream from the reception buffer 123 and performs reception control on the codestream. More specifically, the controller 124 performs processing, such as reflecting data loss in the feedback information and recovering lost data.

In step S205, the decoder 125 decodes the codestream to obtain image data. In step S206, the output interface 126 outputs the image data obtained in the processing in step S205.

In step S207, the transmission interface 121 transmits the feedback information, generated in the processing in step S204, to the transmitting device 101 through the transmission channel.

In step S208, the transmission interface 121 determines whether or not the reception processing is to be finished. When it is determined that the reception processing is not to be finished, the process returns to step S201 and the subsequent processing is repeated. When it is determined in step S208 that the reception processing is to be finished, the reception processing ends.

Figure 16:
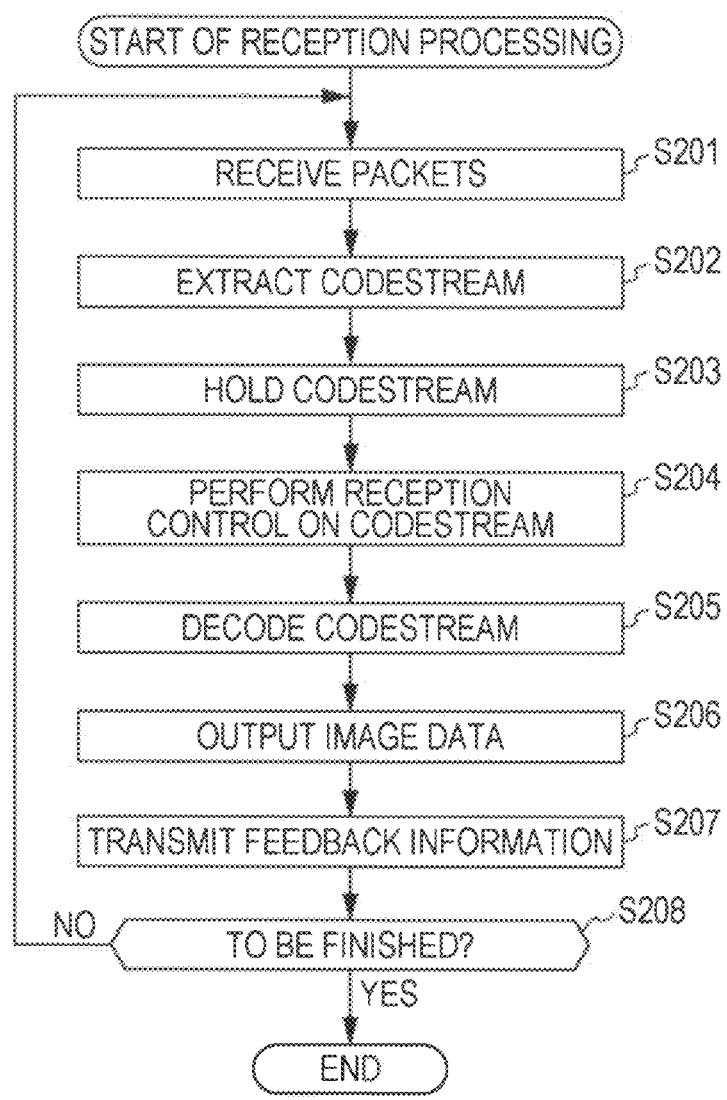
FIG. 16 is a flowchart illustrating an example of a flow of reception processing.
Figure 17:
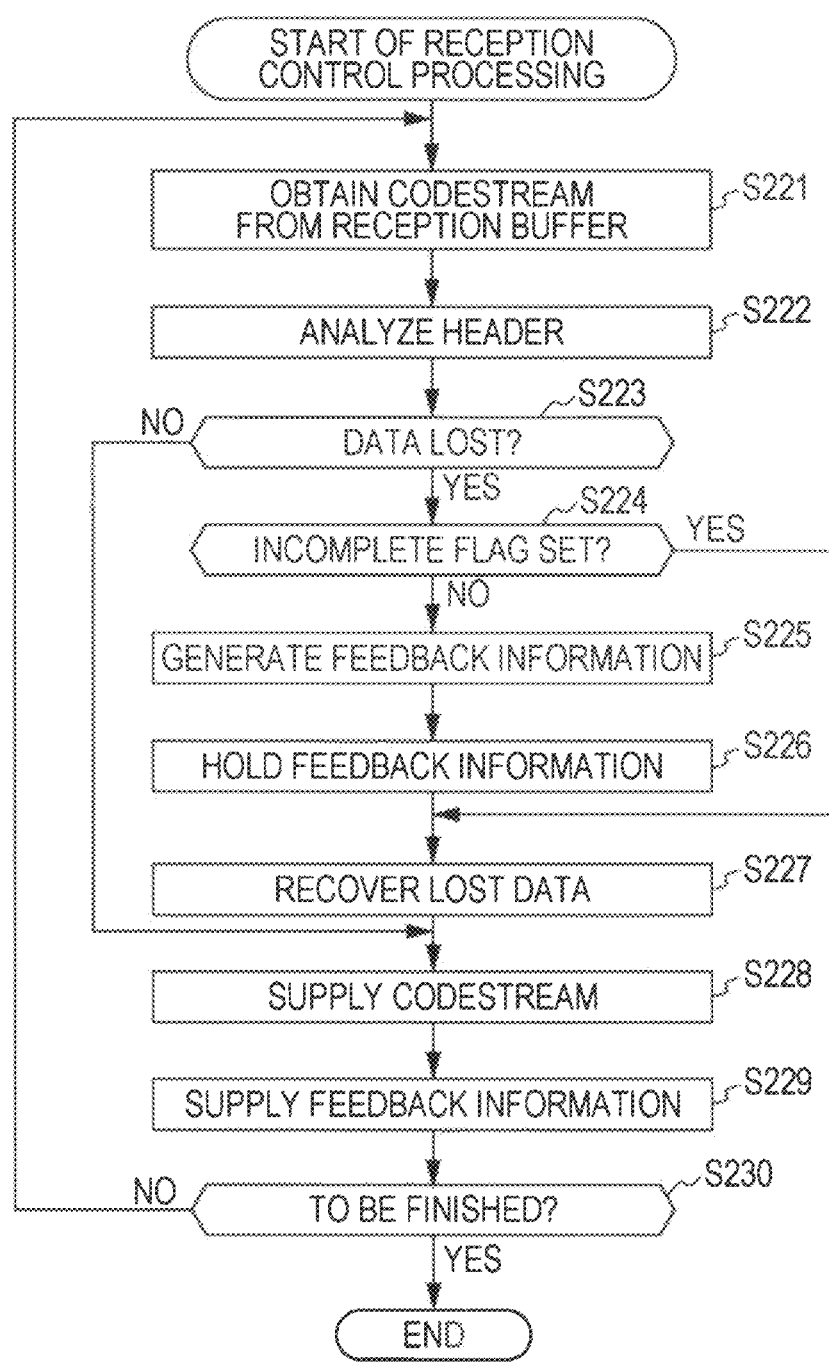
FIG. 17 is a flowchart illustrating an example of a flow of reception control processing.

The reception control processing executed in step S204 in FIG. 16 will be described next in more detail. An example of a flow of the reception control processing executed by the controller 124 will now be described with reference to a flowchart shown in FIG. 17.

In step S221, the data obtaining section 351 obtains the codestream from the reception buffer 123. In step S222, the header analyzing section 352 analyzes the header of the codestream obtained in the processing in step S221.

In step S223, the header analyzing section 352 determines whether or not data in the codestream is lost. When it is determined that data is lost, the process proceeds to step S224. In step S224, the header analyzing section 352 checks whether or not an incomplete flag is set. When it is determined that no incomplete flag is set, the process proceeds to step S225.

In step S225, the feedback-information generating section 353 generates feedback information indicating the data loss. In step S226, the feedback-information holding section 356 holds the feedback information generated in the processing in step S225.

When the feedback information is held, the process proceeds to step S227. When it is determined in step S224 that an incomplete flag is set, the processing in steps S225 and S226 is skipped and the process proceeds to step S227.

In step S227, the recovery processor 354 recovers the lost data while referring to the header, as appropriate. Upon completion of the recovery processing, the process proceeds to step S228. When it is determined in step S223 that no data loss exists, the processing in steps S224 to S227 is skipped and the process proceeds to step S228.

In step S228, the data supplying section 355 supplies the codestream to the decoder 125. In step S229, the feedback-information supplying section 357 reads the feedback information held in the feedback-information holding section 356 and supplies the read feedback information to the transmission interface 121.

In step S230, the data obtaining section 351 determines whether or not the reception control processing is to be finished. When it is determined that the reception control processing is not to be finished, the process returns to step S221 and the subsequent processing is repeated. When it is determined in step S230 that the reception control processing is to be finished, the reception control processing ends.

Figure 18:
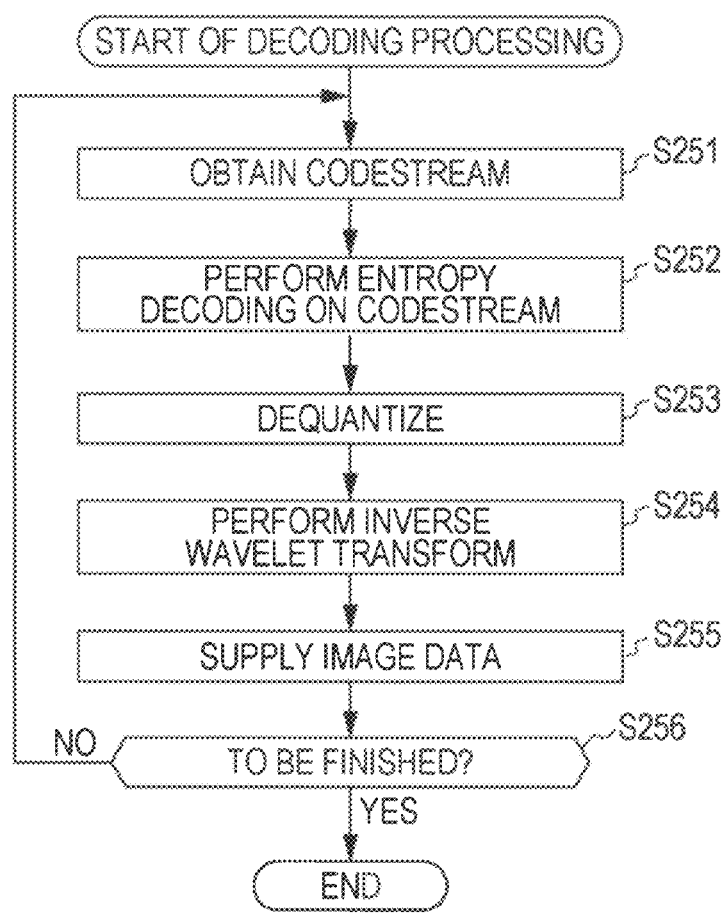
FIG. 18 is a flowchart illustrating an example of a flow of decoding processing.

The decoding processing executed in step S205 in FIG. 16 will be described next in more detail. An example of a flow of the decoding processing executed by the decoder 125 will now be described with reference to a flowchart shown in FIG. 18.

Upon start of the decoding processing, in step S251, the entropy decoding section 401 obtains the codestream. In step S252, by using a scheme corresponding to the entropy encoding performed by the entropy encoding section 203, the entropy decoding section 401 performs entropy decoding on the codestream, obtained in the processing in step S251, to obtain coefficient data.

In step S253, the dequantizing section 402 dequantizes the coefficient data, obtained in the processing in step S252, in accordance with the quantization step size in the quantization processing performed by the quantizing section 202.

In step S254, by using a scheme corresponding to the wavelet transform performed by the wavelet transform section 201, the inverse wavelet transform section 403 performs inverse wavelet transform on the dequantized coefficient data to obtain baseband image data. In step S255, the inverse wavelet transform section 403 supplies the image data, obtained in the processing in step S254, to the output interface 126.

In step S256, the entropy decoding section 401 determines whether or not the decoding processing is to be finished. When it is determined that the decoding processing is not to be finished, the process returns to step S251 and the subsequent processing is repeated. When it is determined in step S256 that the decoding processing is to be finished, the decoding processing ends.

Through the various types of processing as described above, the receiving device 102 can suppress a decrease in the playback image quality of a moving image. That is, the communication system 100 can suppress image-quality deterioration that occurs during transmission of image data.

[Configuration of Personal Computer]

The above-described series of processing can be executed by hardware or software. When the series of processing is to be executed by software, a program included in the software is installed, for example, from a program-storing medium to a computer incorporated into dedicated hardware or a general-purpose personal compute or the like that is capable of executing various functions through installation of various programs.

The above-described series of processing, which can be executed by hardware or software, may be implemented by, for example, a personal computer as shown in FIG. 19.

In FIG. 19, a personal computer 500 has a CPU (central processing unit) 501, which executes various types of processing in accordance with a program stored in a ROM (read only memory) 502 or a program loaded from a storage section 513 into a RAM (random access memory) 503. The RAM 503 also stores, for example, data that the CPU 501 uses to execute various types of processing, as appropriate.

The CPU 501, the ROM 502, and the RAM 503 are interconnected through a bus 504. The bus 504 is also connected to an input/output interface 510.

An input section 511, an output section 512, the storage section 513, and a communication section 514 are connected to the input/output interface 510. The input section 511 includes a keyboard, a mouse, and so on. The output section 512 includes, for example, a display, such as a CRT (cathode ray tube) display or an LCD (liquid crystal display), and a speaker. The storage section 513 includes a hard disk and so on. The communication section 514 includes a modem or the like. The communication section 514 performs processing for communication over a network, including the Internet.

A drive 515 is further connected to the input/output interface 510, as appropriate. A removable medium 521 on which a program is recorded is loaded into the drive 515, as appropriate, and the computer program read therefrom is installed on the storage section 513, as appropriate. Examples of the removable medium 521 include a magnetic disk (including a flexible disk), an optical disk (including a CD-ROM [Compact Disc-Read Only Memory], a DVD [Digital Versatile Disc], and a magneto-optical disc (including an MD [Mini Disc])), and a semiconductor memory.

When the above-described series of processing is executed by software, a program included in the software is installed through a network or from a storage medium.

For example, as shown in FIG. 19, the storage medium may be not only the removable medium 521 distributed to a user to supply the program independently from the main unit of the device, but also the hard disk (on which the program is recorded) included in the storage section 513 or the ROM 502 to be distributed to a user in a state in which it is preinstalled in the main unit of the device.

The program executed by the computer may be a program that time-sequentially performs processing according to the sequence described hereinabove, may be a program that performs processing in parallel, or may be a program that performs processing at an arbitrary timing, for example, at the time when the program is called.

Herein, the steps describing the program recorded on the storage medium not only include processing that is time-sequentially performed according to the described sequence, but also include processing that is concurrently or individually executed without necessarily being time-sequentially processed.

The term "system" as used herein refers to an entirety constituted by multiple devices.

The element described above as a single device (or a single processor) may also be divided to configure multiple devices (or processors). Conversely, the elements described above as multiple devices (or processors) may be integrated together to configure a single device (or a single processor). Needless to say, an element other than those described above may also be added to the configuration of the above-described individual devices (or processors). Moreover, when the configuration and the operation of the entire system are substantially the same, part of the configuration of one device (or processor) may be incorporated into the configuration of another device (or processor). That is, the embodiments of the present invention are not limited to the above-described particular embodiments, and various changes and modifications can be made thereto without departing from the spirit and scope of the present invention.

The present application contains subject matter related to that disclosed in Japanese Priority Patent Application JP 2009-083255 filed in the Japan Patent Office on Mar. 30, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
    encoding circuitry to encode image data to generate a codestream, the image data being for transmission to an other information processing device;
    hardware processing circuitry including:
        a controlling unit to control whether or not main data of the codestream is to be transmitted based on whether or not an amount of data of the codestream generated by the encoding circuitry exceeds an allowable rate that is an upper limit value of a bitrate at which the codestream is flawlessly transmittable; and
        a packetizing unit to packetize the codestream into packets when the amount of data of the codestream does not exceed the allowable rate, and to packetize only a header of the codestream when the amount of data of the codestream exceeds the allowable rate, based on control performed by the controlling unit; and
    transmitting circuitry to transmit the packets packetized by the packetizing unit to the other information processing device,
    wherein, before the codestream is held in a buffer, the controlling unit controls whether or not the main data of the codestream is to be transmitted,
    wherein the packetizing unit reads the codestream held in the buffer and packetizes the read codestream, and
    wherein the controlling unit includes:
        a monitoring unit to monitor an amount of buffer, the amount of buffer indicating an amount of data of the codestream held in the buffer;
        an allowable-rate setting unit to set the allowable rate based on a current amount of buffer monitored by the monitoring unit and an upper limit value of a transmittable bitrate of a transmission channel through which the packets are transmitted to the other information processing device;
        a determining unit to determine whether or not the amount of data of the codestream exceeds the allowable rate set by the allowable-rate setting unit;
        a supplying unit to supply the codestream to the buffer to be held therein; and
        an adding unit to add flag information to the header of the codestream when the determining unit determines that the amount of data of the codestream exceeds the allowable rate,
    wherein, when the flag information is added to the header of the codestream, the packetizing unit discards the main data of the codestream and packetizes only the header.

2. The information processing device according to claim 1, wherein the controlling unit includes a target-rate setting unit to determine a target rate based on the upper limit value of the transmittable bitrate of the transmission channel, the target rate having a target value of an amount of code in the encoding performed by the encoding circuitry, and
    wherein the allowable-rate rate setting unit sets the allowable rate based on the current amount of buffer monitored by the monitoring unit and the target rate determined by the target-rate setting unit.

3. The information processing device according to claim 2, wherein the hardware processing circuitry further includes an obtaining unit to obtain feedback information indicating a receiving-end data-loss state of the codestream, the feedback information being transmitted from the other information processing device, and
    wherein the target-rate setting unit determines the target rate based on the feedback information obtained by the obtaining unit.

4. The information processing device according to claim 1, wherein the encoding circuitry includes:
    a wavelet transforming circuitry portion to perform wavelet transform processing on the image data, the wavelet transform processing including processing in which analysis filter processing to decompose, for each band, frequency components of the image data into low-frequency components and high-frequency components, is recursively performed on low-frequency components a predetermined number of times;
    a quantizing circuitry portion to quantize the frequency components decomposed for each band; and
    an entropy encoding circuitry portion to perform entropy encoding on the frequency components quantized by the quantizing circuitry portion.

5. The information processing device according to claim 4, wherein the wavelet transforming circuitry portion performs the wavelet transform processing for each precinct including continuous lines in a picture of the image data.

6. An information processing method comprising:
    causing encoding circuitry of an information processing device to encode image data to generate a codestream, the image data being for transmission to an other information processing device;
    causing control circuitry of the information processing device to control whether or not main data of the codestream is to be transmitted based on whether or not an amount of data of the generated codestream exceeds an allowable rate that is an upper limit value of a bitrate at which the codestream is flawlessly transmittable;
    causing packetizing circuitry of the information processing device to packetize the codestream into packets when the amount of data of the codestream does not exceed the allowable rate, and to packetize only a header of the codestream when the amount of data of the codestream exceeds the allowable rate, based on control performed by the control circuitry; and
    causing transmitting circuitry of the information processing device to transmit the packets to the other information processing device,
    wherein, before the codestream is held in a buffer, the control circuitry controls whether or not the main data of the codestream is to be transmitted,
    wherein the packetizing circuitry reads the codestream held in the buffer and packetizes the read codestream, and
    wherein the method further comprises causing the control circuitry to:
        monitor an amount of buffer, the amount of buffer indicating an amount of data of the codestream held in the buffer;
        set the allowable rate based on a current amount of buffer monitored and an upper limit value of a transmittable bitrate of a transmission channel through which the packets are transmitted to the other information processing device;

determine whether or not the amount of data of the codestream exceeds the set allowable rate;
supply the codestream to the buffer to be held therein; and
add flag information to the header of the codestream when it is determined that the amount of data of the codestream exceeds the allowable rate,
wherein, when the flag information is added to the header of the codestream, the main data of the codestream is discarded and only the header is packetized.

7. An information processing device comprising:
receiving circuitry to receive a codestream transmitted from an other information processing device;
hardware processing circuitry including:
a analyzing unit to analyze a header of the codestream received by the receiving circuitry;
a loss determining unit to determine whether or not data in the codestream is lost based on a first result of the analysis performed by the analyzing unit; and
a recovering unit to recover, when the loss determining unit determines that the data is lost, the lost data based on information included in the header;
decoding circuitry to decode the codestream whose lost data is recovered by the recovering unit or the codestream determined by the loss determining unit as a codestream without loss of the data;
transmitting circuitry to transmit, to the other information processing device that transmitted the received codestream, feedback information to notify the other information processing device regarding a state of data loss in the codestream;
flag-information determining circuitry to determine whether or not flag information added by the other information processing device is present in the header based on a second result of the analysis performed by the analyzing unit; and
generating circuitry to generate the feedback information, when the loss determining unit determines that the data is lost and the flag-information determining circuitry determines that the flag information is absent in the header.

8. The information processing device according to claim 7, wherein the recovering unit recovers the lost data using data selected based on weighting of a quantization parameter included in the header.

9. An information processing method comprising:
causing receiving circuitry of an information processing device to receive a codestream transmitted from an other information processing device;
causing analyzing circuitry of the information processing device to analyze a header of the received codestream;
causing loss determining circuitry of the information processing device to determine whether or not data in the codestream is lost based on a result of the analysis;
causing recovering circuitry of the information processing device to recover, when it is determined that the data is lost, the lost data based on information included in the header;
causing decoding circuitry of the information processing device to decode the codestream whose lost data is recovered or the codestream determined as a codestream without loss of the data;
causing transmitting circuitry to transmit, to the other information processing device that transmitted the received codestream, feedback information to notify the other information processing device regarding a state of data loss in the codestream;

causing flag-information determining circuitry to determine whether or not flag information added by the other information processing device is present in the header based on a second result of the analysis performed by the analyzing circuitry; and
causing generating circuitry to generate the feedback information, when the loss determining circuitry determines that the data is lost and the flag-information determining circuitry determines that the flag information is absent in the header.

10. An information processing device comprising:
encoding circuitry configured to encode image data to generate a codestream, the image data being for transmission to an other information processing device;
hardware processing circuitry including:
a controlling section configured to control whether or not main data of the codestream is to be transmitted based on whether or not an amount of data of the codestream generated by the encoding circuitry exceeds an allowable rate that is an upper limit value of a bitrate at which the codestream is flawlessly transmittable; and
a packetizing section configured to packetize the codestream into packets when the amount of data of the codestream does not exceed the allowable rate, and to packetize only a header of the codestream when the amount of data of the codestream exceeds the allowable rate, based on control performed by the controlling section; and
transmitting circuitry configured to transmit the packets packetized by the packetizing section to the other information processing device,
wherein, before the codestream is held in a buffer, the controlling section controls whether or not the main data of the codestream is to be transmitted,
wherein the packetizing section reads the codestream held in the buffer and packetizes the read codestream, and
wherein the controlling section includes:
a monitoring section configured to monitor an amount of buffer, the amount of buffer indicating an amount of data of the codestream held in the buffer;
an allowable-rate setting section configured to set the allowable rate based on a current amount of buffer monitored by the monitoring section and an upper limit value of a transmittable bitrate of a transmission channel through which the packets are transmitted to the other information processing device;
a determining section configured to determine whether or not the amount of data of the codestream exceeds the allowable rate set by the allowable-rate setting section;
a supplying section configured to supply the codestream to the buffer to be held therein; and
an adding section configured to add flag information to the header of the codestream when the determining section determines that the amount of data of the codestream exceeds the allowable rate,
wherein, when the flag information is added to the header of the codestream, the packetizing section discards the main data of the codestream and packetizes only the header.

11. The information processing device according to claim 10, wherein the controlling section includes a target-rate setting section configured to determine a target rate based on the upper limit value of the transmittable bitrate of the transmission channel, the target rate having a target value of an amount of code in the encoding performed by the encoding circuitry, and wherein the allowable-rate rate setting section sets the allowable rate based on the current amount of buffer monitored by the monitoring section and the target rate determined by the target-rate setting section.

12. The information processing device according to claim 11, wherein the hardware processing circuitry further includes an obtaining section configured to obtain feedback information indicating a receiving-end data-loss state of the codestream, the feedback information being transmitted from the other information processing device, wherein the target-rate setting section determines the target rate based on the feedback information obtained by the obtaining section.

13. The information processing device according to claim 10, wherein the encoding circuitry includes:

a wavelet transforming section configured to perform wavelet transform processing on the image data, the wavelet transform processing including processing in which analysis filter processing to decompose, for each band, frequency components of the image data into low-frequency components and high-frequency components, is recursively performed on low-frequency components a predetermined number of times;

a quantizing section configured to quantize the frequency components decomposed for each band; and an entropy encoding section configured to perform entropy encoding on the frequency components quantized by the quantizing section.

14. The information processing device according to claim 13, wherein the wavelet transforming section performs the wavelet transform processing for each precinct including continuous lines in a picture of the image data.

15. An information processing method comprising:

causing encoding circuitry of an information processing device to encode image data to generate a codestream, the image data being for transmission to an other information processing device;

causing controlling circuitry of the information processing device to control whether or not main data of the codestream is to be transmitted based on whether or not an amount of data of the generated codestream exceeds an allowable rate that is an upper limit value of a bitrate at which the codestream is flawlessly transmittable;

causing packetizing circuitry of the information processing device to packetize the codestream into packets when the amount of data of the codestream does not exceed the allowable rate, and to packetize only a header of the codestream when the amount of data of the codestream exceeds the allowable rate, based on control performed by the controlling circuitry; and causing transmitting circuitry of the information processing device to transmit the packets to the other information processing device;

wherein, before the codestream is held in a buffer, the controlling circuitry controls whether or not the main data of the codestream is to be transmitted, wherein the packetizing circuitry reads the codestream held in the buffer and packetizes the read codestream, and wherein the method further comprises causing the controlling circuitry to:

monitor an amount of buffer, the amount of buffer indicating an amount of data of the codestream held in the buffer;

set the allowable rate based on a monitored current amount of buffer monitored and an upper limit value of a transmittable bitrate of a transmission channel through which the packets are transmitted to the other information processing device;

determine whether or not the amount of data of the codestream exceeds the set allowable rate;

supply the codestream to the buffer to be held therein; and add flag information to the header of the codestream when it is determined that the amount of data of the codestream exceeds the allowable rate, wherein, when the flag information is added to the header of the codestream, the main data of the codestream is discarded and only the header is packetized.

16. An information processing device comprising:

receiving circuitry configured to receive a codestream transmitted from an other information processing device;

hardware processing circuitry including:

an analyzing section configured to analyze a header of the codestream received by the receiving circuitry;

a loss determining section configured to determine whether or not data in the codestream is lost based on a first result of the analysis performed by the analyzing section; and a recovering section configured to recover, when the loss determining section determines that the data is lost, the lost data based on information included in the header;

decoding circuitry configured to decode the codestream whose lost data is recovered by the recovering section or the codestream determined by the loss determining section as a codestream without loss of the data;

transmitting circuitry configured to transmit, to the other information processing device that transmitted the received codestream, feedback information to notify the other information processing device regarding a state of data loss in the codestream;

flag-information determining circuitry configured to determine whether or not flag information added by the other information processing device is present in the header based on a second result of the analysis performed by the analyzing section; and generating circuitry configured to generate the feedback information, when the loss determining section determines that the data is lost and the flag-information determining circuitry determines that the flag information is absent in the header.

17. The information processing device according to claim 16, wherein the recovering section recovers the lost data using data selected based on weighting of a quantization parameter included in the header.

18. An information processing method comprising:

causing receiving circuitry of an information processing device to receive a codestream transmitted from an other information processing device;

causing analyzing circuitry of the information processing device to analyze a header of the received codestream;

causing loss determining circuitry of the information processing device to determine whether or not data in the codestream is lost based on a result of the analysis;

causing recovering circuitry of the information processing device to recover, when it is determined that the data is lost, the lost data based on information included in the header;

causing decoding circuitry of the information processing device to decode the codestream whose lost data is recovered or the codestream determined as a codestream without loss of the data;

causing transmitting circuitry of the information processing device to transmit, to the other information processing device that transmitted the received codestream, feedback information to notify the other information processing device regarding a state of data loss in the codestream;

causing flag-information determining circuitry to determine whether or not flag information added by the other information processing device is present in the header based on a second result of the analysis performed by the analyzing circuitry; and causing generating circuitry to generate the feedback information, when it is determined that the data is lost and that the flag information is absent in the header.

* * * * *